US006594378B1

(12) United States Patent
Li et al.

(10) Patent No.: US 6,594,378 B1
(45) Date of Patent: Jul. 15, 2003

(54) METHOD, SYSTEM AND COMPUTER READABLE MEDIUM FOR COMPUTERIZED PROCESSING OF CONTRALATERAL AND TEMPORAL SUBTRACTION IMAGES USING ELASTIC MATCHING

(75) Inventors: Qiang Li, Clarendon Hills, IL (US); Shigehiko Katsuragawa, Chicago, IL (US); Kunio Doi, Willowbrook, IL (US)

(73) Assignee: Arch Development Corporation, Chicago, IL (US)

( * ) Notice: Subject to any disclaimer, the term of this patent is extended or adjusted under 35 U.S.C. 154(b) by 0 days.

(21) Appl. No.: 09/692,218

(22) Filed: Oct. 20, 2000

Related U.S. Application Data
(60) Provisional application No. 60/160,790, filed on Oct. 21, 1999.

(51) Int. Cl.[7] .................................................. G06K 9/00
(52) U.S. Cl. ....................... 382/128; 128/922; 382/130
(58) Field of Search ............................ 382/128, 132, 382/130, 100, 108, 199, 151; 128/922; 356/39; 377/10

(56) References Cited

U.S. PATENT DOCUMENTS

| 4,870,692 | A | * | 9/1989 | Zuiderveld et al. ............ 382/6 |
| 5,668,888 | A | * | 9/1997 | Doi et al. .................... 382/132 |
| 6,067,373 | A | * | 5/2000 | Ishida et al. ................. 382/130 |
| 6,272,233 | B1 | * | 8/2001 | Takeo ......................... 382/128 |

OTHER PUBLICATIONS

Ishida et al, Medical Physics, vol. 26, No. 7, pp. 1320–1329, "Iterative Image Warping Technique for Temporal Subtraction of Sequential Chest Radiographs to Detect Interval Change", Jul. 1999.*
Image Transforms—Hough Transform, 12 pages http://www.dai.ed.ac.uk/HIPR2/hough.htm.

T. Ishida, et al., Medical Physics, vol. 26, No. 7, pp. 1320–1329, "Iterative Image Warping Technique for Temporal Subtraction of Sequential Chest Radiographs to Detect Interval Change", Jul., 1999.

Y–L. Fok, et al., IEEE Transactions on Medical Imaging, vol. 15, No. 3, pp. 353–368, "Automated Analysis of Nerve–Cell Images Using Active Contour Models", Jun. 1, 1996.

A. Kano, et al., Medical Physics, vol. 21, No. 3, pp. 453–461, "Digital Image Subtraction of Temporally Sequential Chest Images for Detection of Interval Change", Mar. 1, 1994.

A. J. Mendez, et al., Medical Physics, vol. 25, No. 6, pp. 957–964, "Computer–Aided Diagnosis: Automatic Detection of Malignant Masses in Digitized Mammograms", Jun., 1998.

F. Vogelsang, et al., SPIE Conference on Image Processing, vol. 3338, Pt. 1–2, pp. 774–785, "Detection and Compensation of Rib Structures in Chest Radiographs for Diagnose Assistance", Feb. 23–26, 1998.

* cited by examiner

Primary Examiner—Leo Boudreau
Assistant Examiner—Barry Choobin
(74) Attorney, Agent, or Firm—Oblon, Spivak, McClelland, Maier & Neustadt, P.C.

(57) ABSTRACT

A method, system and computer readable medium of computerized processing of chest images including obtaining digital first and second images of a chest and detecting rib edges in at least one of the first and second images. The rib edges are detected by correlating points in the at least one of the first and second images to plural rib edge models using a Hough transform to identify approximate rib edges in one of the images, and delineating actual rib edges derived from the identified approximate rib edges using a snake model. The method system and computer readable medium further include deriving the shift values using the actual rib edges and warping one of the first and second images to produce a warped image which is registered to the other of the first and second images based at least in part on the shift values.

45 Claims, 32 Drawing Sheets

METHOD, SYSTEM AND COMPUTER READABLE MEDIUM FOR COMPUTERIZED PROCESSING OF CONTRALATERAL AND TEMPORAL SUBTRACTION IMAGES USING ELASTIC MATCHING

The present invention claims priority under 35 U.S.C. §1.119(e) to U.S. provisional patent application No. 60/160,790 filed Oct. 21, 1999, incorporated by reference herein.

STATEMENT REGARDING FEDERALLY SPONSORED RESEARCH

The present invention was made in part with U.S. Government support under USPHS grant numbers CA62625 and CA64370 (National Institute of Health). The U.S. Government has certain rights in the invention.

BACKGROUND OF THE INVENTION

FIELD OF THE INVENTION

The present invention relates generally to a computerized method and system to aid radiologists in detection of asymmetric abnormalities in chest radiographs.

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,740,268; 5,790,690; 5,832,103; 5,873,824; 5,881,124; and 5,931,780 as well as U.S. patent application Ser. Nos. 08/173,935; 08/398,307 (PCT Publication WO 96/27846); Ser. No. 08/523,210 (PCT Publication WO 95/15537); Ser. Nos. 08/536,149; 08/562,087; 08/757,611; 08/900,191; 08/900,361; 08/900,362; 08/900,188; 08/900,189, 08/900,192; 08/979,623; 08/979,639; 08/982,282; 09/027,468; 09/027,685; 09/028,518; 09/053,798; 09/092,004; 09/098,504; 09/121,719; 09/131,162; 09/141,535; and 09/156,413; and U.S. provisional patent application No. 60/107,095, all of which are incorporated herein by reference. Of these patents and applications, U.S. Pat. Nos. 5,224,177; 5,359,513; Ser. Nos. 08/900,191; 08/900,362; 09/053,798; and No. 60/107,095 are of particular interest.

The present invention includes use of various technologies referenced and described in the above-noted U.S. Patents and Applications, as well as described in the references identified in the appended APPENDIX by the author(s) and year of publication andcross-referenced throughout the specification by numerals in brackets corresponding to the respective references listed in the APPENDIX, the entire contents of which, including the related patents and applications listed above and references listed in the APPENDIX, are incorporated herein by reference.

DISCUSSION OF THE BACKGROUND

Detection of early lung cancers on chest radiographs is a difficult task for radiologists, because subtle lesions tend to be low in contrast and can overlap with ribs and clavicles. To assist radiologists in the detection of asymmetric abnormalities on digital chest radiographs, a novel contralateral subtraction technique has been proposed.[1] The contralateral subtraction technique is applied by subtracting a right/left reversed "mirror" image from an original image, and symmetric skeletal structures such as ribs can be eliminated because the chest image of the right peripheral hemithorax is generally similar to that of the left hemithorax. With previous contralateral subtraction techniques, [1] 91% of contralateral subtraction images were rated as being of adequate, good, or excellent quality by use of a subjective evaluation method. However, misregistration errors were observed in nine of one hundred cases (i.e., 9%). These were mainly caused by the asymmetry of the posterior ribs on the right and left lungs. These asymmetric ribs on chest images are often caused by inappropriate positioning of a patient, and thus the locations and shapes of peripheral ribs in the mirror image appear different from those in the original image.

Another problem in the previous subtraction technique was that some minor misregistration errors were present in many of the subtraction images. This occurred because a global polynomial fitting technique was employed in the previous subtraction technique for smoothing of shift values over the entire lungs, and thus "correct" shift values in some locations were slightly degraded.

SUMMARY OF THE INVENTION

Accordingly, it is an object of the present invention to provide a method and system for warping two lungs of a mirror image as a preprocessing step prior to application of a contralateral subtraction technique so that rib structures in the mirror image become comparable to those in an original image.

It is another object of the present invention to provide a method and system for reducing misregistration errors by use of a localized smoothing technique, such as an elastic matching technique, for shift values.

These and other objects are achieved according to the present invention by providing a novel method, system and computer readable medium of computerized processing of chest images including obtaining digital first and second images of a chest and detecting rib edges in at least one of the first and second images. The rib edges are detected by correlating points in the at least one of the first and second images to plural rib edge models using a Hough transform to identify approximate rib edges in one of the images, and delineating actual rib edges derived from the identified approximate rib edges using a snake model. The method, system and computer readable medium further include deriving shift values using the actual rib edges and warping one of the first and second images to produce a warped image which is registered to the other of the first and second images based at least in part on the shift values.

According to another aspect of the present invention, there is provided a novel method, system and computer readable medium of computerized processing of chest images including obtaining digital first and second images of a chest, selecting template regions of interest (ROIs) in one of the first and second images and search area ROIs in the other of the first and second images, determining cross correlation values between pixels in the template ROIs and the search area ROIs, and determining of shift vectors for the template ROIs. The shift vectors are determined by determining local shift vectors between pixels in the search ROIs relative to the template ROIs, determining internal and external energies based on smoothness of the local shift vectors and the cross correlation values, respectively, and modifying the local shift vectors based at least in part on the internal and external energies. The method system and computer readable medium further include producing the shift vectors based on the modified local shift vectors and warping one of the first and second images to produce a warped image which is registered to the other of the first and second images based at least in part on the shift vectors.

The present invention further includes a computer readable medium storing program instructions by which the method of the invention can be performed when the stored program instructions are appropriately loaded into a computer, and a system for implementing the method of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

The chest images used in development of the present invention consist of 50 normals and 50 abnormals with solitary lung nodules selected from 247 chest images in the Japanese Standard Digital Image Database developed by the Japanese Society of Radiological Technology. [10] Prior to the selection of the 100 images, about 30 abnormal cases with too obvious or too subtle nodules, or with non-peripheral nodules were eliminated. The 100 cases used were selected randomly from the remaining cases. The images were digitized with a 0.175 mm pixel size, a matrix size of 2048×2048, and 12-bit gray levels. However, in order to detect relatively large lesions overlapping with ribs, the matrix size was reduced to 512×512 by subsampling of the original image data, and the number of gray levels was decreased to 10 bits.

Figure 1:
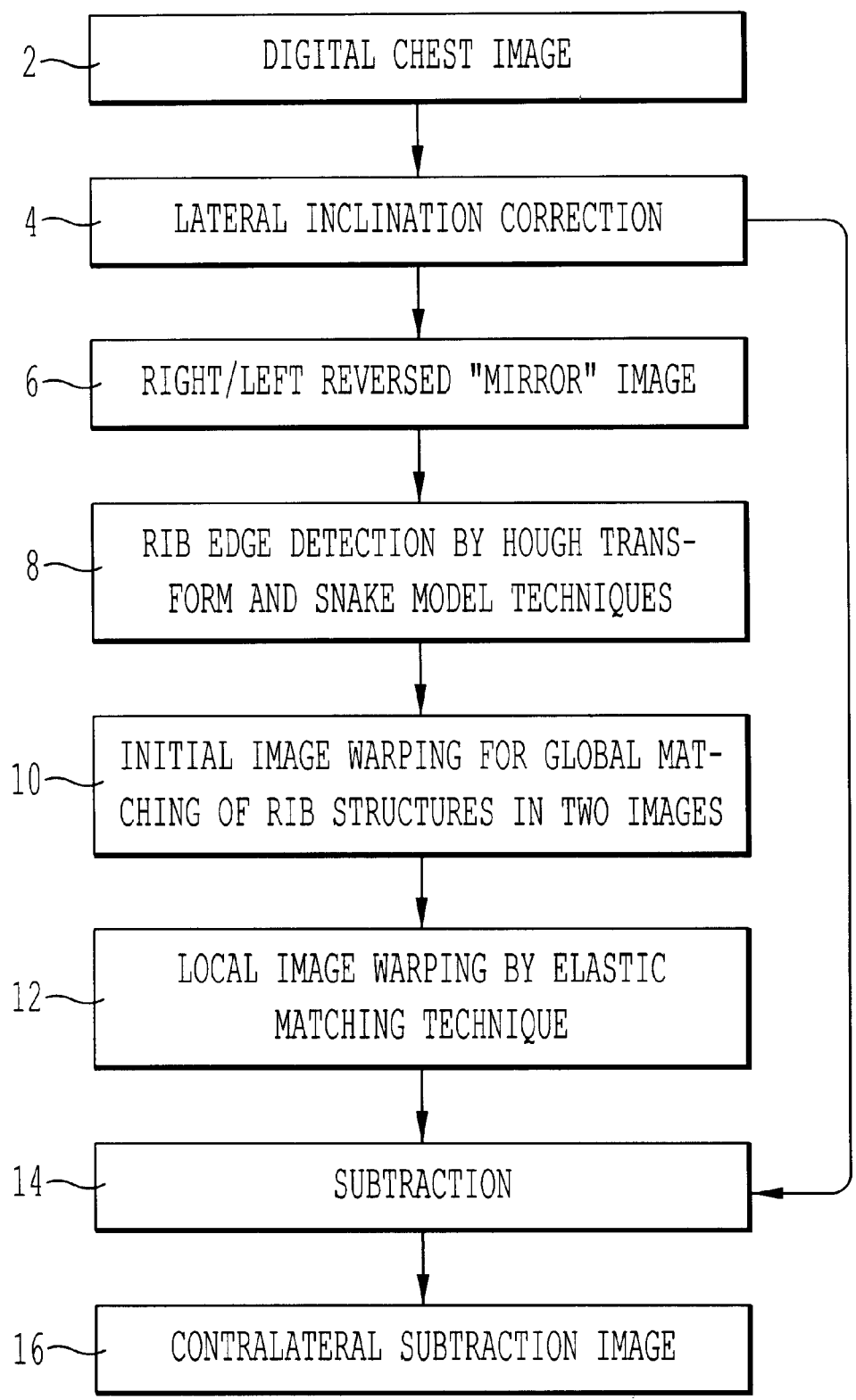
FIG. 1 is a flowchart illustrating an overall scheme of a contralateral subtraction technique for PA chest images.

Referring now to the drawings, wherein like reference numerals designate identical or corresponding parts throughout the several views, and more particularly to FIG. 1 thereof, there is illustrated a top-level block diagram of a contralateral subtraction technique according to the present invention, as is further discussed.

First of all, a model based detection technique for rib edges is developed. By use of four models for typical rib edges, the approximate locations of rib edges in the original image and the mirror image are determined by a generalized Hough transform technique.[2] The accurate locations are then determined by application of a snake model technique. [3–5] Next, the detected rib edges are then used for determination of the vertical shift values for pixels on the rib edges in the mirror image relative to the corresponding rib edges in the original image. These shift values are then fitted to a two dimensional (2-D) third order polynomial for smoothing, interpolating, and extrapolating the vertical shift values over the entire lungs of the mirror image. The lungs are warped as a preprocessing step according to the vertical shift values so that the locations and shapes of ribs in the mirror image become comparable to those in the original image.

In order to reduce misregistration errors further in the subtraction images, an elastic matching technique [6–9] is employed to register accurately the original image and the mirror image. In this technique, the cross correlation values between the original image and the mirror image for each region of interest (ROI) are first obtained, and then the shift vectors for each of the ROIs are determined in an iterative manner based on both the cross correlation values and the local consistency between the adjacent shift vectors. This method is similar to fitting local shift vectors to a spline polynomial function,[6] and thus noise is smoothed and local variations in "correct" shift vectors can be maintained. The final shift vectors are expected to have large cross correlation values, and also to be locally smooth. Therefore, the elastic matching technique is capable of registering images with very complex local distortions on the two lungs in chest radiographs.

Overall Scheme of the Contralateral Subtraction Technique

The overall scheme of the new contralateral subtraction technique is illustrated in FIG. 1. First, after a digital chest image is obtained (step 2), the lateral inclination of a posteroanterior (PA) chest image caused by variation in patient positioning is corrected by aligning the midline of the thorax to the centerline of the image with an image rotation technique (step 4). The original image is then right/left reversed to provide a mirror image (step 6), and the rib edges in the mirror image are detected by the generalized Hough transform [2] and snake model techniques (step 8). [3–5] An initial image warping technique is applied to the mirror image for global matching of the rib structures in the original image and the mirror image by use of the detected rib edges (step 10). The globally warped mirror image is then matched accurately with the original image and subsequently warped locally by means of an elastic matching technique (step 12). Finally, the warped image is subtracted (step 14) from the lateral inclination corrected original image (step 4) to provide a contralateral subtraction image (step 16).

Lateral Inclination Correction and Right/left Reversed Mirror Image

An important problem associated with the contralateral subtraction technique is the lateral inclination of the thorax in a chest image, because the contralateral subtraction technique may be influenced by asymmetry of the two lungs. It is therefore typically necessary to correct the lateral inclination by using the midline of the chest image (FIG. 1, step 4) before the contralateral subtraction technique is applied. As described elsewhere, [1] the ribcage edges on both sides of the lungs are first detected by analysis of the first and second derivatives of profiles through chest images.[11] The average horizontal locations of the right and the left ribcage edges at the same vertical position are then determined and fitted to a straight line for determination of the midline. The lateral inclination is corrected by rotating and shifting of the original image so that the midline of the thorax is aligned with the centerline of the image, as described previously. [1] The corrected original image is then reversed in the horizontal direction to provide the mirror image (FIG. 1, step 6).

Delineation of Rib Edges by Generalized Hough Transform and Snake Model Techniques The lower edges of the posterior ribs are first detected in the mirror image. However, the rib edges in the original image, which is used later for determination of vertical shift values for points along the rib edges in the mirror image, can be obtained by reversing the rib edges in the mirror image horizontally. Therefore, it is not typically necessary to actually detect the rib edges in the original image. Because rib edges are located within the right and left lung regions, the regions outside the two lungs are excluded from the subsequent analysis. This analysis is performed by use of the detected ribcage edges and cardiac edges [11] in a chest image. Because the detection technique for rib edges in the right and the left lung is identical, the detection of lower rib edges in one lung, i.e., the left lung in the mirror image corresponding to the left side of the displayed mirror image, is mainly discussed.

Figure 2:
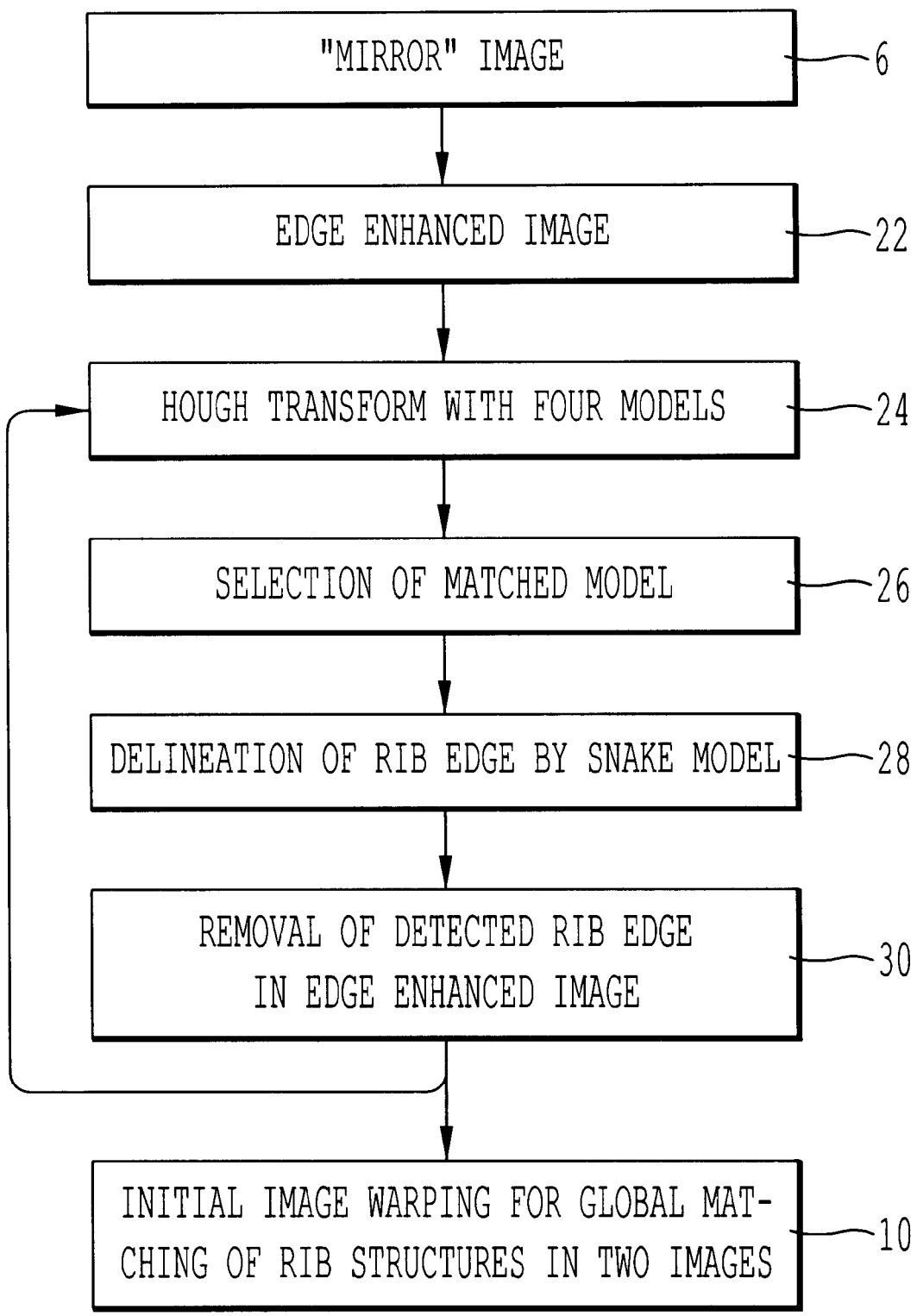
FIG. 2 is a flowchart illustrating a basic scheme for detection of rib edges by using generalized Hough transform and snake model techniques.

The basic scheme of the rib edge detection technique (FIG. 1, step 8) is illustrated in FIG. 2. First, four models or templates of typical patterns of rib edges are produced empirically. It should be noted that this procedure typically needs to be done only once. An edge enhanced image is obtained (step 22), as is later described, and a generalized Hough transform technique [2] is applied to determine initial candidates of rib edges by use of the models (step 24). Because four models were employed, four candidate locations can be found, respectively, in four Hough transform spaces, among which only one with the largest Hough transform value is selected as the initial candidate (step 26). This selected model is used as an initial snake model for accurate delineation of a rib edge (step 28). The delineated rib edge is then removed from the edge enhanced image (step 30) so that detection of other rib edges can be continued. The generalized Hough transform and snake model techniques are applied repeatedly to the edge enhanced image for detection of the remaining rib edges (steps 24–30), until a desired number of rib edges are identified.

Determination of Rib Edge Models

Figure 3:
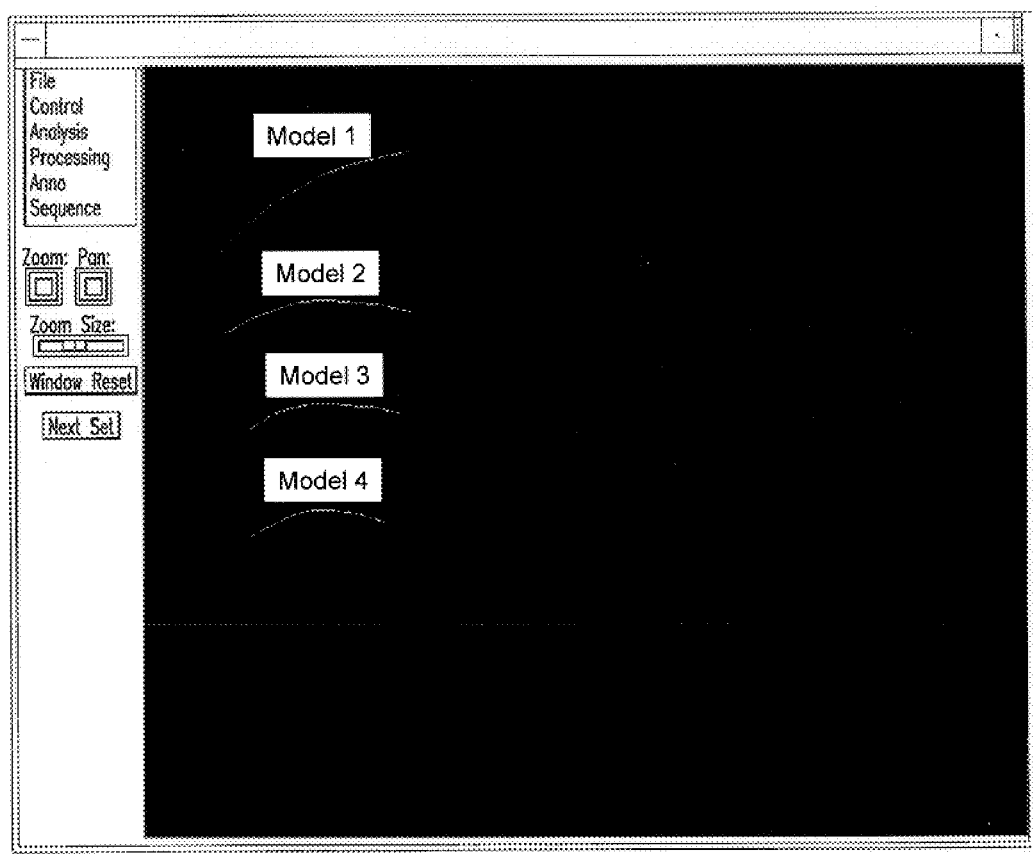
FIG. 3 is a diagram illustrating four models (Nos. 1, 2, 3, and 4) representing various shapes of rib edges used in a generalized Hough transform technique.

Several analytical functions, such as an elliptical function and a parabolic function, have been used as models or approximate shapes of actual rib edges in chest images. [12, 13] However, there are difficulties in employing these models for detection of rib edges by use of the Hough transform. First, it is uncertain whether rib edges can be approximated well by these simple functions. Second, for locating a model in a chest image, three or four unknown parameters need to be determined by the Hough transform. [13, 14] Therefore, a three or four dimensional Hough transform space is typically required, which implies the need for a large memory and a long computation time. In the present invention, a rib edge model is defined as a nonparametric curve, that is, a series of 2-D coordinates. Because rib edges may have a variety of shapes, a single rib edge model is usually insufficient to represent all of the actual rib edges. Therefore, four rib edge models (e.g., models 1–4) are employed in the present invention to represent various shapes of the rib edges, as shown in FIG. 3. To represent a model, the center of gravity for the model is determined as a reference point, and the coordinates of the model relative to the reference point are stored for all of the points on the model. The model is then used to determine the location of the rib edges. Note that only a 2-D Hough transform space is typically necessary to locate such a model in a chest image.

Determination of Edge Enhanced Image

Figure 4A:
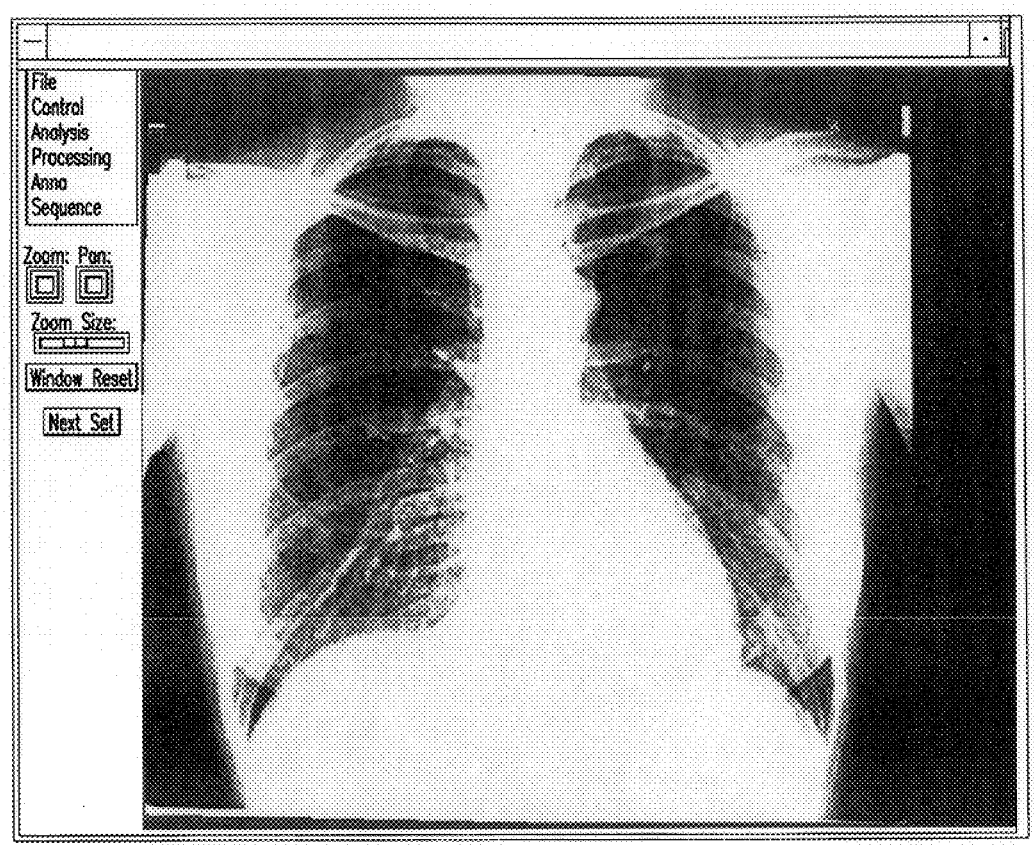
FIGS. 4(a)–(e) are images illustrating (a) an original chest image, (b) a mirror image of the original chest image, (c) an initially warped mirror image, (d) an edge enhanced image in the two lungs obtained by applying a Sobel operator to the mirror image, and (e) a final edge enhanced image determined by analysis of an edge gradient orientation histogram.
Figure 4B:
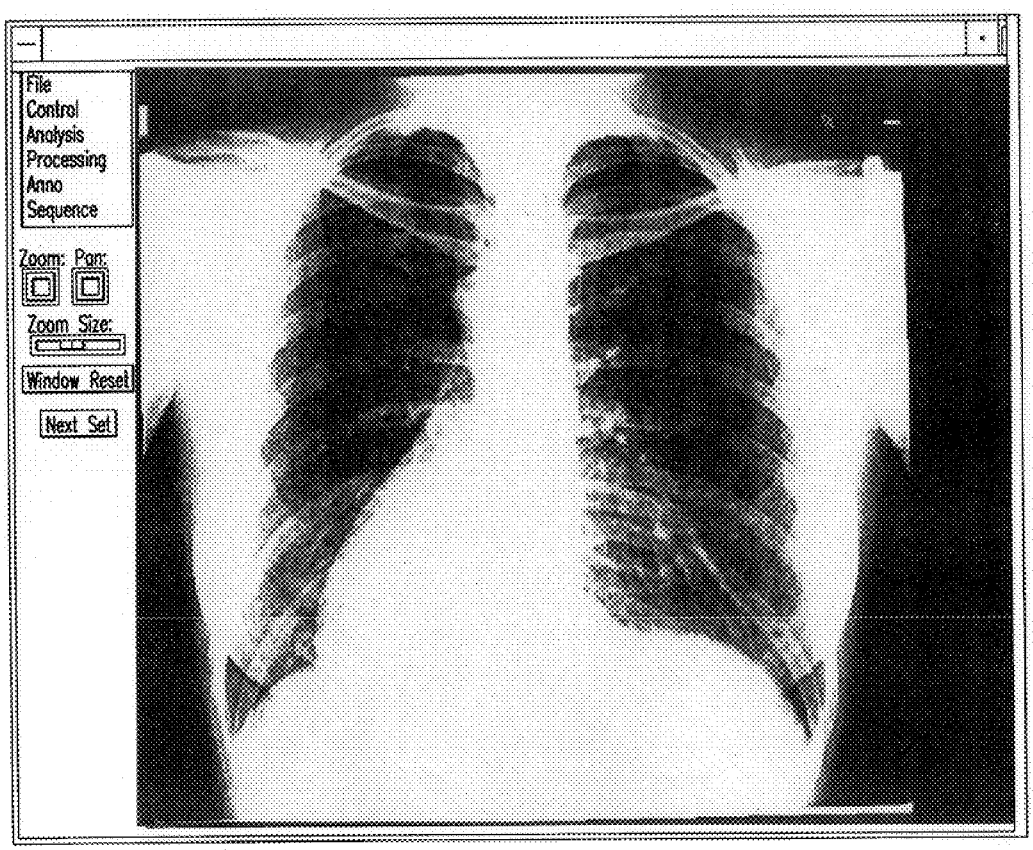
Figure 4C:
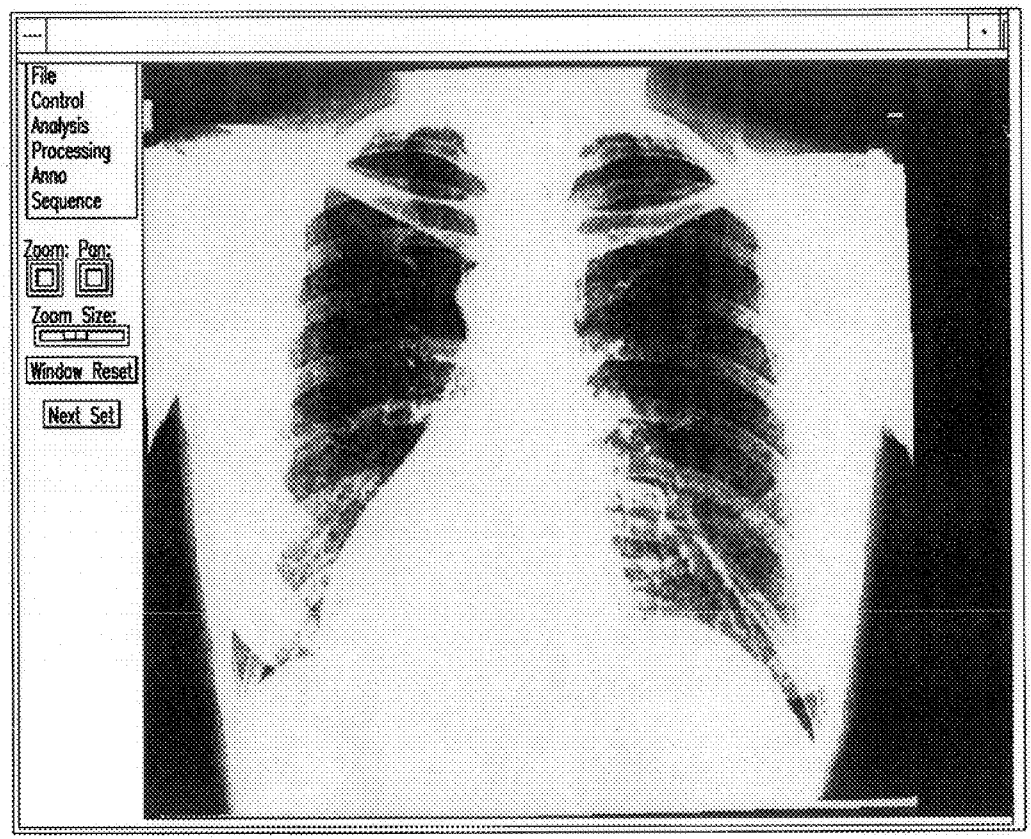
Figure 4D:
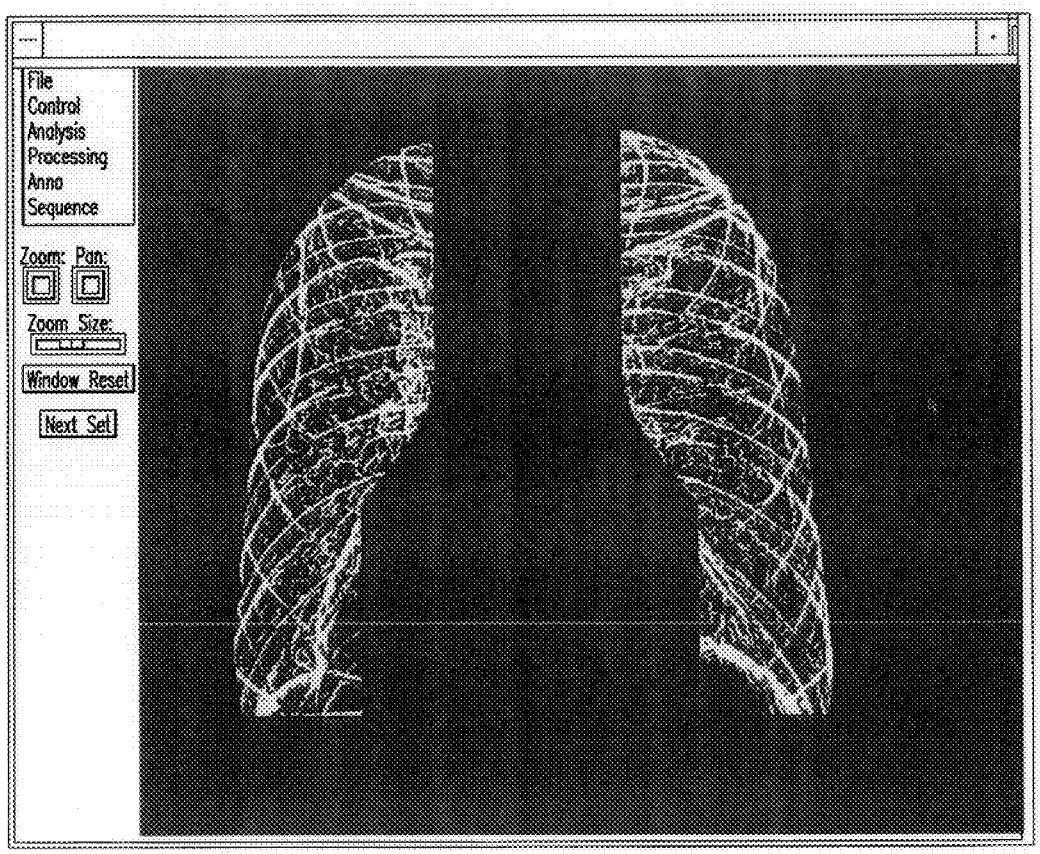
Figure 4E:
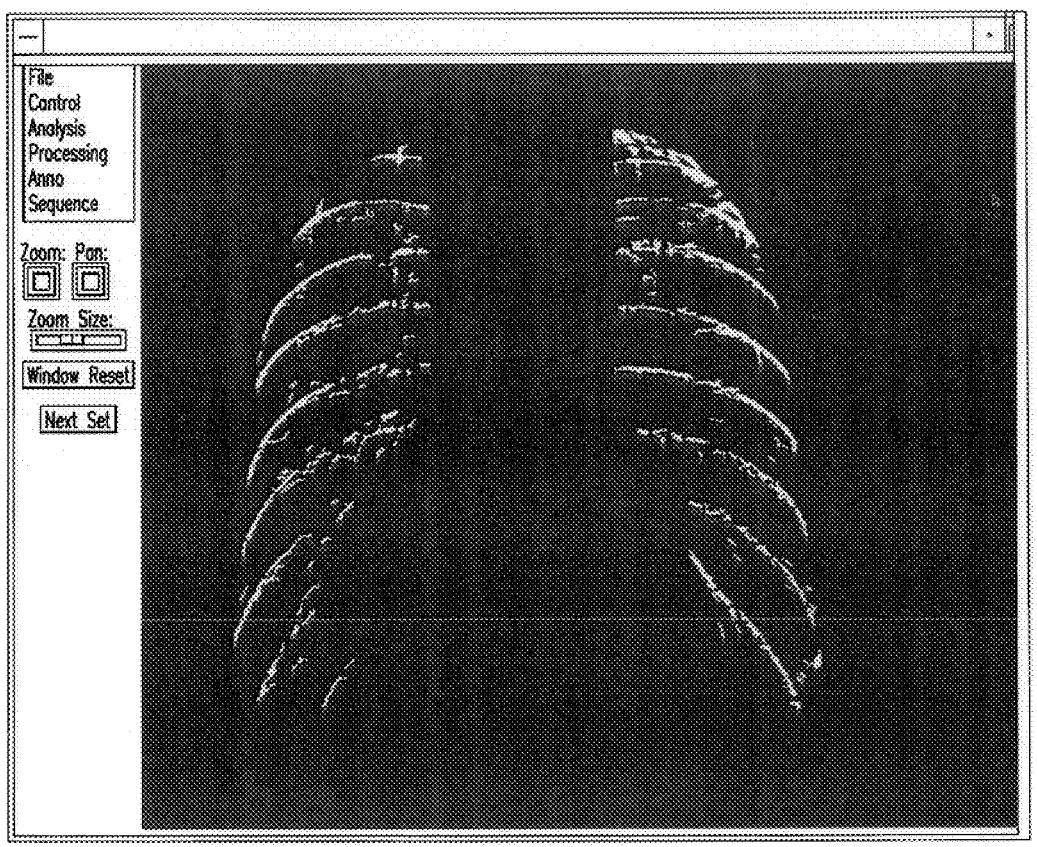

A Sobel gradient operator [15] is first applied to the mirror image to produce an edge enhanced image and a gradient orientation image thereof (FIG. 2, step 22). FIG. 4(a) shows an original chest image with the corrected lateral inclination, FIG. 4(b) shows the mirror image, and FIG. 4(c) shows the initially warped mirror image, as is described in detail later. FIG. 4(d) shows the edge enhanced image of FIG. 4(b) with some noise and many unwanted edges, such as ribcage edges, upper rib edges, anterior ribs, and clavicles. However, most of the unwanted edges can be eliminated from the edge enhanced image by analysis of the edge gradient orientation histogram, [12] as shown in FIG. 4(e). In the present invention, those edge pixels with orientations between 90° and 170°, which correspond to the lower edges of the posterior ribs, were selected. The edge enhanced image is finally obtained by use of pixels that contain only the top 35% of large edge gradients in the lung regions.

Initial Detection of Rib Edges by Generalized Hough Transform

The generalized Hough transform is often used when the shape of an object such as the rib edges to be detected could not be described by a simple analytical equation. [2] It should be noted that the generalized Hough transform technique is conceptually identical to the method used for matched filter [16] or template matching, although this technique is computationally more efficient. The value of the generalized Hough transform is defined over a 2-D space with a matrix size typically identical to that of the edge enhanced image. The magnitude of a value for the generalized Hough transform at a point indicates the likelihood that the model is located at that point. A pixel with non-zero pixel value in the edge enhanced image may match any point in the model, and accordingly a reference point can be determined in the image. The value of the generalized Hough transform at this reference point is then incremented by the magnitude of the edge value (i.e., pixel value in the edge enhanced image) to represent a contribution from the edge pixel. Once all of the contributions from edge pixels have been summed, a maximum value of the generalized Hough transform can be determined. The maximum value indicates the maximum likelihood of the match between the model and an actual lower edge of posterior ribs in the edge enhanced image. The corresponding location is then considered as the matched reference point for the model.

Figure 5A:
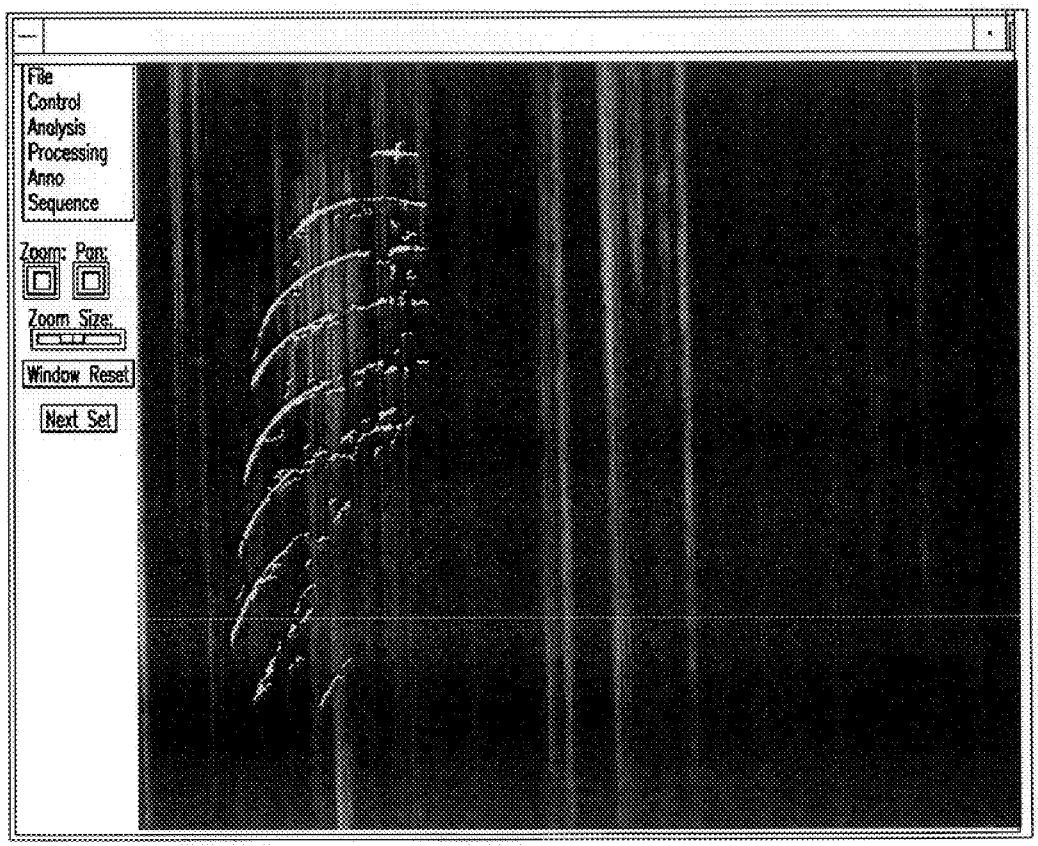
FIGS. 5(a)–(f) are images illustrating (a) an edge enhanced image in the left lung of the mirror image of FIG. 4(b), (b)–(e) results of four generalized Hough transforms obtained by use of the four models (Nos. 1, 2, 3, and 4) of FIG. 3, and (f) an edge enhanced image with a "best" model superimposed at a matched location determined by a generalized Hough transform technique.
Figure 5B:
Figure 5C:
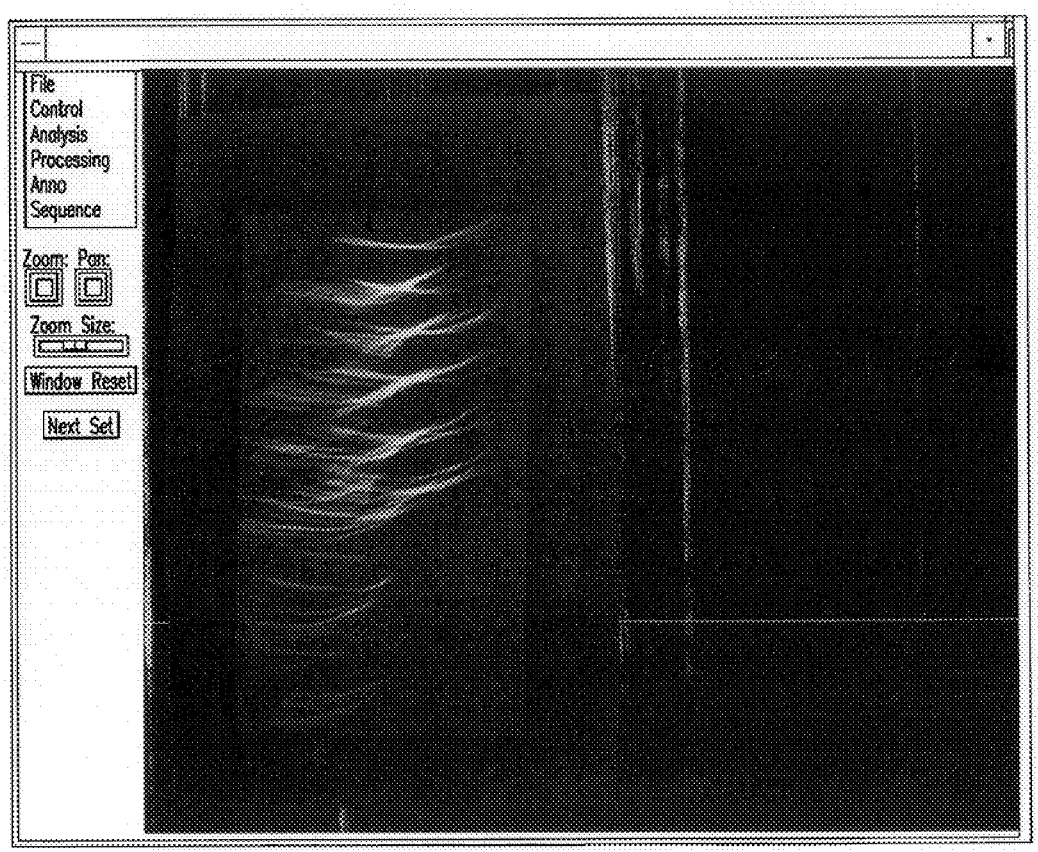
Figure 5D:
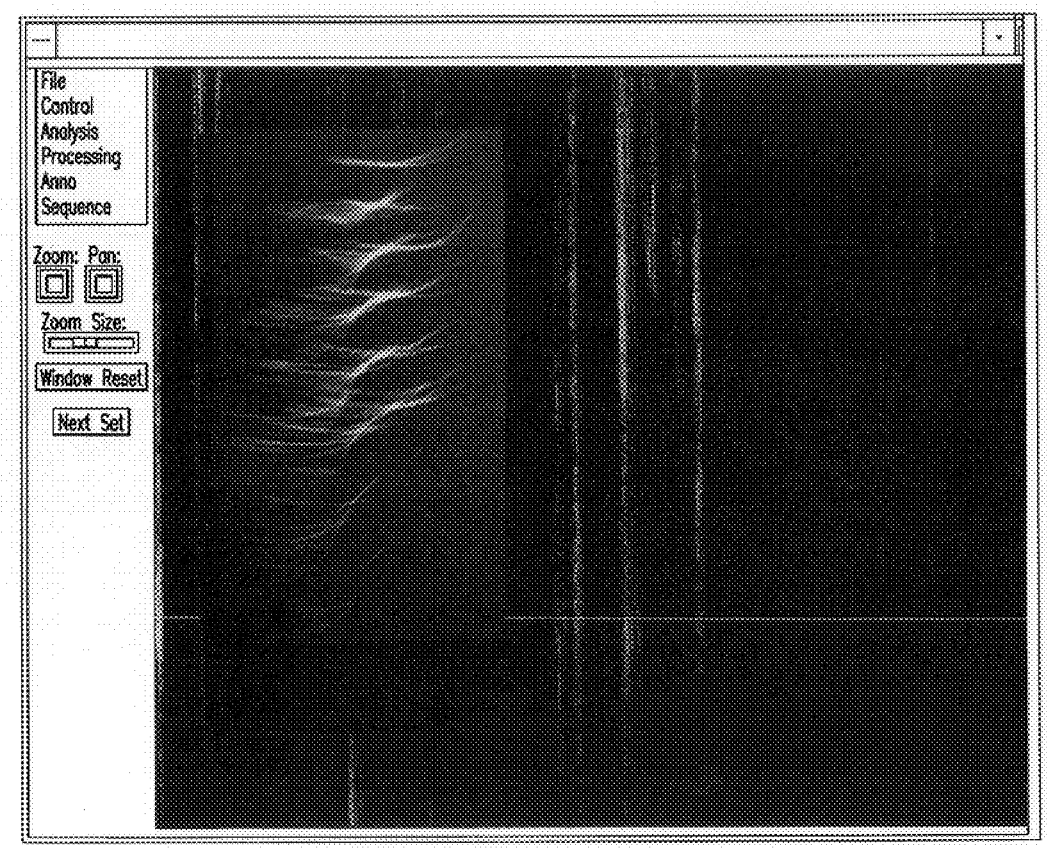
Figure 5E:
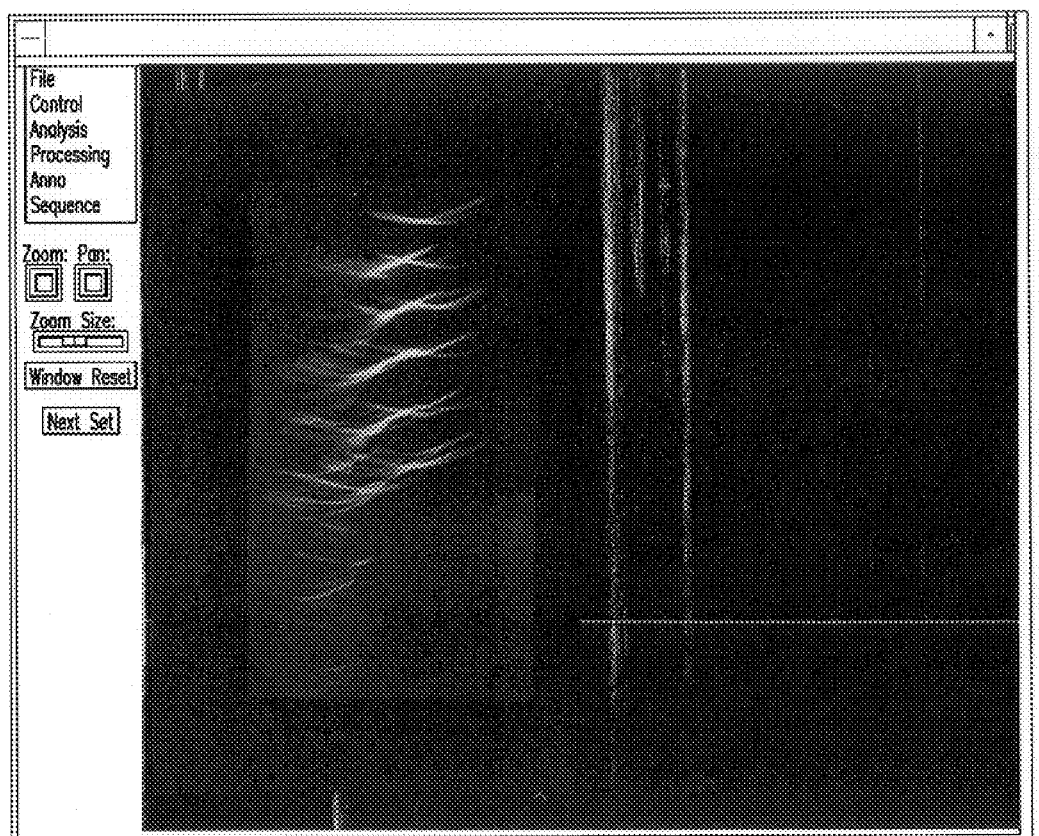
Figure 5F:
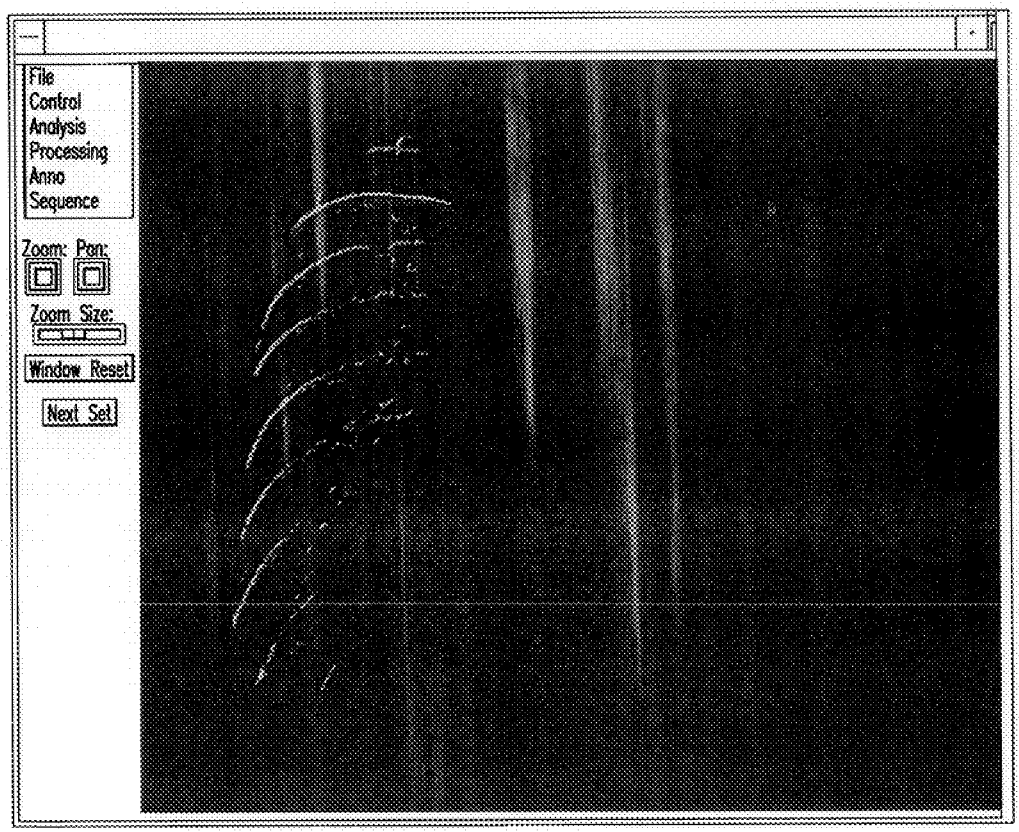

The generalized Hough transform is obtained by using each of the four models applied to rib edges. FIG. 5(a) shows the left lung region of the edge enhanced mirror image in FIG. 4(e). FIGS. 5(b), (c), (d), and (e) show results of the four generalized Hough transforms obtained by applying the four models to FIG. 5(a). It is apparent that strong edge points and edge patterns similar to the model provide large values in the Hough transition space. Therefore, the largest maximum in the four Hough transform spaces is selected as the initial candidate of a lower edge of a posterior rib. FIG. 5(f) illustrates the edge enhanced image superimposed with the model, which has the largest maximum at the matched location in the four Hough transform spaces.

In order to detect a number of rib edges in the edge enhanced image, a rib edge is first determined by use of the generalized Hough transform technique described above. A snake model technique is then employed, as is described in the next section, to delineate the rib edge accurately. For detection of another rib edge, the first rib edge detected and adjacent areas thereof are cleared to zero in the edge enhanced image, so that the same rib edge will not be detected again. This procedure is repeated six times in each lung for determination of six "strong" rib edges.

Accurate Delineation of Rib Edges by a Snake Model Technique

It is usually very difficult to detect continuous and smooth curves accurately from actual digital images, due to image noise. A snake or active contour model is commonly employed as a virtual physical model for the detection of continuous and smooth curves. The basic concept of the snake model technique was introduced by Kass, Witkin, and Terzopolous [3] and improved by many others as a powerful technique for detection of object contours (e.g., closed curves),[3–5] open curves,[13] and 3-D surfaces,[17] and for tracking deformable objects. [18] With this snake model technique, a continuous deformable curve is deformed toward pixels with large edge values by an external energy, and this technique simultaneously preserves the local smoothness based on resisting strong stretching and bending by internal energy thereof. The internal energy is a measure for examining the continuity and smoothness of the snake, and the internal energy resists the effect of noise components included in the image. The external energy is another measure that indicates the extent of the agreement between the snake and the actual edge in the image. A weighting factor is used to adjust the balance between the internal energy and the external energy. When these two energies are used, the final snake is expected to be a continuous and smooth curve that can match an actual curve, such as a lower edge of a posterior rib. Starting from an initial snake model, a snake can be deformed and can adjust a shape thereof to match an actual curve or a set of data points included in an image via the minimization of a total energy thereof. When a deformable contour reaches an equilibrium between the external and internal energies, a continuous and smooth curve coinciding with an actual edge can be produced.

Definition of Initial Snake, Internal Energy, and External Energy

The initial snake used for a snake model technique provides an important initial approximation of rib edges, because the final snake generally depends greatly on the initial snake. For a good final result, the initial snake should typically be located as close as possible to the actual rib edge. As an initial snake the rib edge model determined by use of the generalized Hough transform described above is employed. Usually, the distance between snaxels (i.e., points on the snake) is greater than one pixel, and thus the detected rib edge model is subsampled by a factor of 5, which produces the initial snake with a snaxel distance of approximately 5 pixels.

For a specific snaxel, the internal energy is defined as the squared sum of the first derivatives and the second derivatives along the snake. [3–5] The first derivatives become large if a large gap appears at the snaxel, so that the first derivative behaves like a string that resists stretching. The second derivatives become large if the snake bends strongly at the snaxel; therefore, the second derivative behaves like a rod that resists bending. The external energy is defined as the negative values of the edge gradient at the snaxel.[3–5] Therefore, a strong edge point provides a small external energy.

The local energy for the snaxel is a weighted sum of the internal and the external energy, and the total energy for a snake is the sum of the local energies for all snaxels along the snake. Various weighting factors between the internal and the external energy, which typically range from 0.5 to 2.0, were used, and there was no significant difference between the detected rib edges obtained with these weighting factors. Therefore, the weighting factor was determined empirically as 1.0. Because the final snake is determined through the minimization of a total energy thereof, the snake is drawn toward those points with large edge gradients (or small external energies). The external energy should typically be normalized as described in a previous paper [5] to prevent snake trapping at some false edge points with strong edge values due to noise.

Evolution of a Snake by Use of a Greedy Algorithm

In order to acquire the final snake, a Greedy Algorithm proposed by William and Shah [5] is used to minimize the total energy for a snake. The Greedy Algorithm is simple, fast, and effective, and works in an iterative manner. Starting from an initial snake, each of the snaxels has a chance independently to move around a neighborhood thereof, and all snaxels may be moved one by one, so that the shape of the snake can change accordingly. This procedure is repeated and called an iteration. At each iteration, a 3×3 neighborhood of each snaxel in the edge enhanced image is examined, and the pixel in the neighborhood with the smallest local energy is chosen as the new location of the snaxel. If most of the snaxels do not change their locations in an iteration, the snake is considered to have reached an equilibrium thereof, and thus the iteration is terminated.

Figure 6:
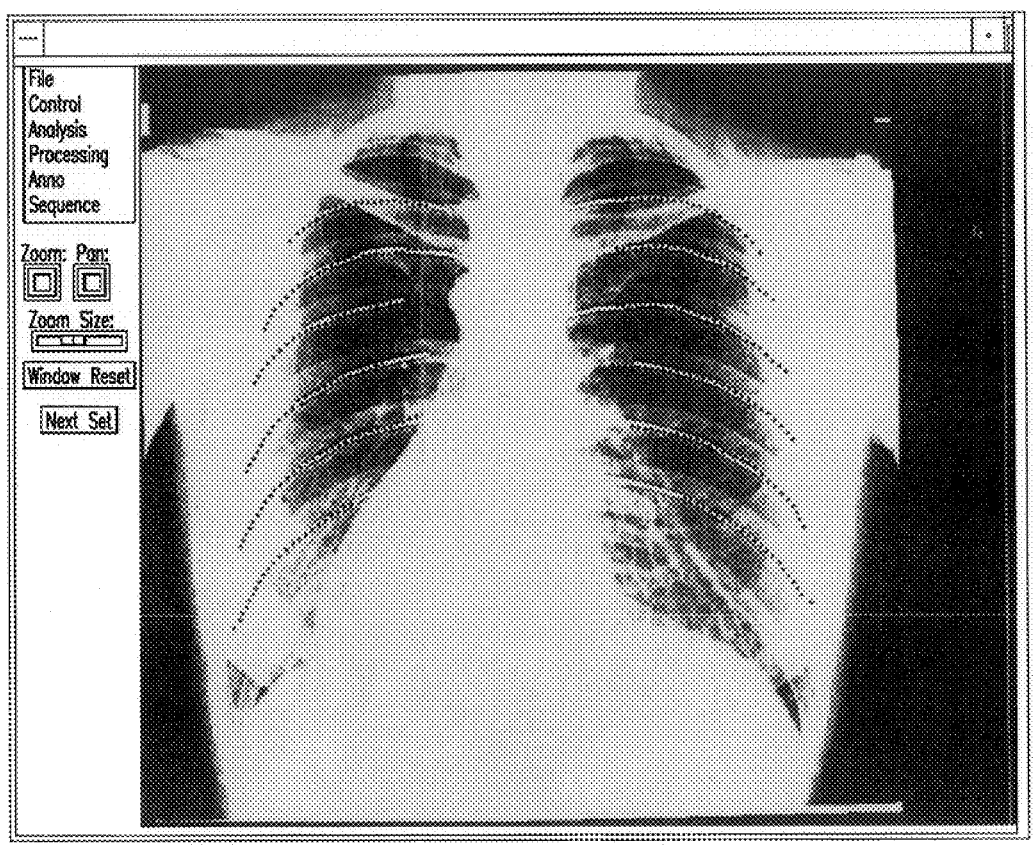
FIG. 6 is a mirror image with six identified models (white solid curves) at matched locations in each lung by use of a generalized Hough transform, and with final rib edges (black dotted curves) obtained by use of a snake model technique.
Figure 7:
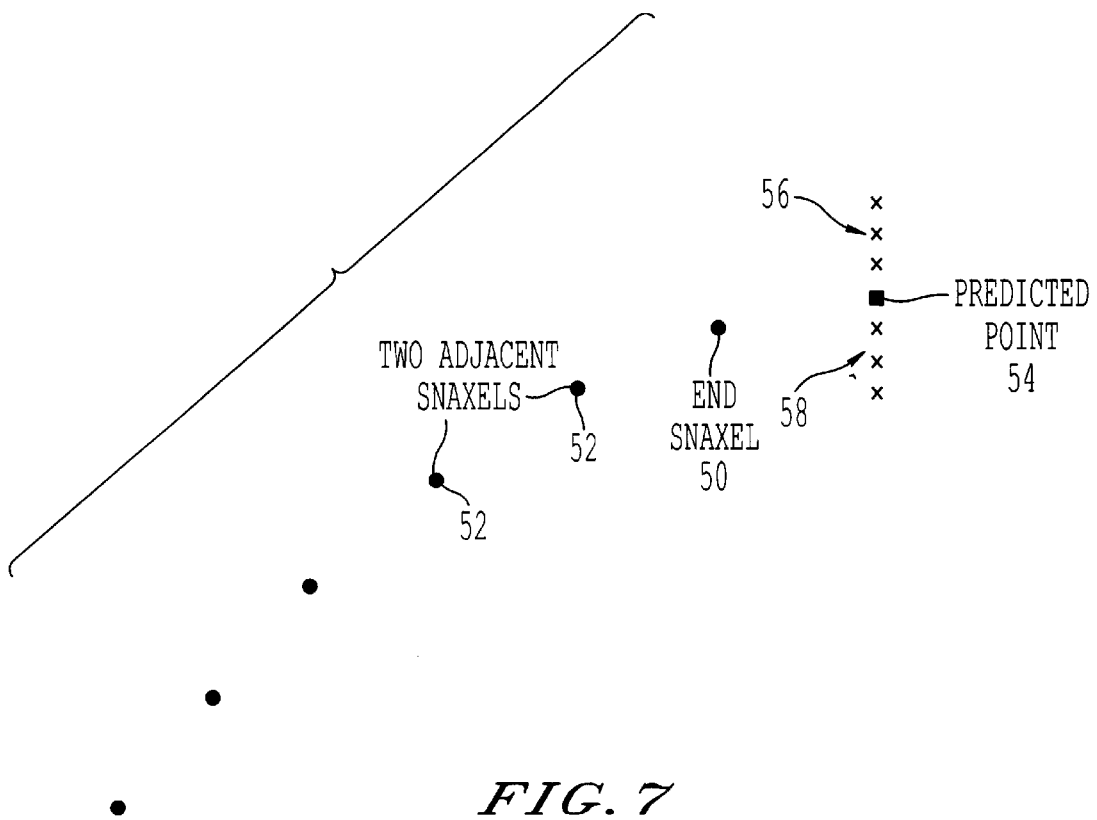
FIG. 7 is a diagram illustrating an extension of a snake model at one end by use of an end snaxel and two adjacent snaxels for predicting an extrapolated point, wherein a new snaxel is selected and added to the snake model from a pixel that has a largest edge gradient value in a small area including a predicted point and upper and lower three pixels thereof.

It should be noted that the rib edge model, which is employed as the initial snake, identified by use of the generalized Hough transform in the edge enhanced image, generally overlaps only partially with an actual rib edge, as shown by the white solid curves in FIG. 6. Therefore, all of the portions of the models outside the lung area are eliminated first, and also, in order to detect the entire actual rib edge, the snake at the two ends was attempted to be extended during each iteration. As shown in FIG. 7, each of the end snaxels 50 and two adjacent snaxels 52 thereof are employed to predict or extrapolate a new point 54 outside the snake by use of a second order polynomial. A new snaxel, which is to be added to the snake, is selected from the pixel that has the largest edge gradient in a small area including the predicted point, and upper 56 and lower 58 three pixels in the vertical direction thereof, as shown in FIG. 7. If this small area contains only pixels with small edge gradients below a threshold value, then the snake is not typically extended at this end. The black dotted curves in FIG. 6 show the delineated rib edges that are evolved from the initial snakes by use of the snake model technique. It should be noted that the final snakes (i.e., dotted curves) represent rib edges more accurately than do the initial snakes (i.e., white curves), and also that the final snakes can be shorter or longer than the initial snakes.

Figure 8:
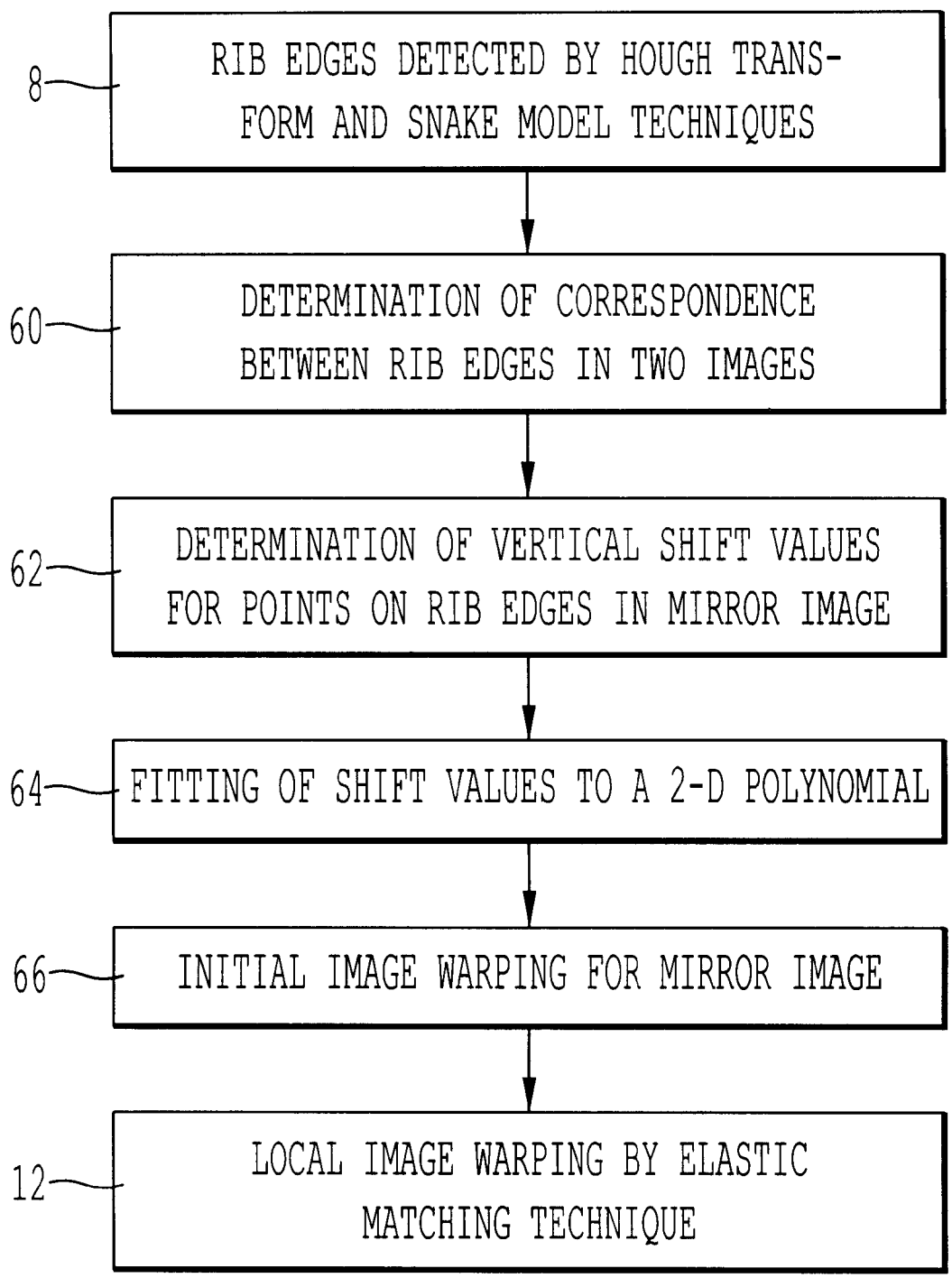
FIG. 8 is a flowchart illustrating a basic scheme of an initial warping technique for global matching of rib structures in original and mirror images.

Initial Image Warping of the Mirror Image for Global Matching of Rib Structures in the Two Images FIGS. 4(a) and (b) show the chest image and a mirror image thereof, respectively. It is apparent that the ribs in the original image and the mirror image are quite asymmetric, particularly in the peripheral lung areas, and typically need to be corrected by warping of the mirror image so that a good subtraction image is obtained. FIG. 8 shows a scheme for initial warping of the mirror image (FIG. 1, step 10) by use of the rib edges detected by the method described above. The correspondence of the rib edges in the two images is identified first (step 60), and the vertical shift values (or the differences in vertical positions) for points along the rib edges in the mirror image are determined to match with the corresponding points in the original image (step 62). These shift values are fitted to a 2-D polynomial for determination of vertical shift values for all pixels in the two lungs of the mirror image (step 64). Finally, the two lungs of the mirror image are warped by use of the fitted shift values (step 66).

Figure 9:
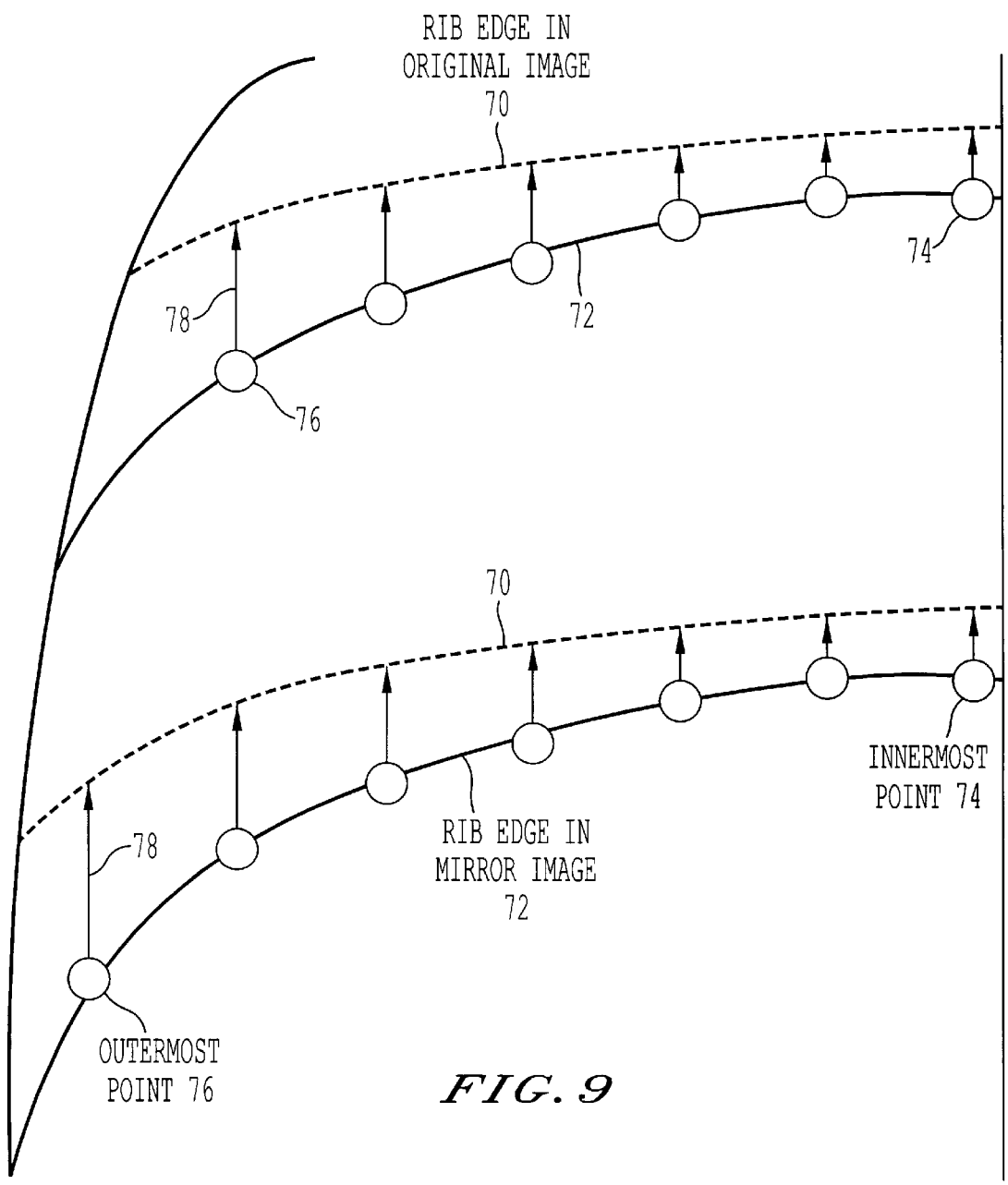
FIG. 9 is a diagram illustrating two pairs of corresponding rib edges in an original image (dashed lines) and a mirror image (solid lines) with some points and vertical shift values thereof, which are used in initial warping of the mirror image for global matching of rib structures in the original and mirror images.

Determination of the Correspondence of Rib Edges in the Original and the Mirror Images FIG. 9 is a schematic illustration of two detected rib edges in the original 70 and the mirror images 72, indicated by dashed and solid curves, respectively. For simplicity, only a few points are illustrated on the rib edges. When the rib structures in one lung are very similar to those in another lung, the corresponding rib edges in the two images are expected to be close to each other in their vertical positions. It was discovered that the vertical position of the innermost point 74 on a rib edge 72 in the mirror image is generally very close to that on the corresponding rib edge 70 in the original image. It should be noted, however, that the vertical positions of the outermost points 76 on the corresponding rib edges of the two images can be quite different, especially when the ribs in the two lungs of the original image are quite asymmetric, as illustrated in FIGS. 4(a) and (b). Therefore, the distance in the vertical positions between the innermost points 74 of the rib edges in each lung of the two images is compared to determine the corresponding pairs of the rib edges. Two rib edges are typically considered to be a potential corresponding pair if the distance between them is less than 15 mm. All potential corresponding pairs are identified, and then the pair that has the minimum distance is selected as the correct corresponding pair.

Determination of Vertical Shift Values Along Rib Edges in the Mirror Image

Once all of the corresponding pairs of rib edges have been identified, the vertical shift values are determined by the vertical distances from the rib edges in the mirror image to those in the original image and are indicated by arrows 78, as shown in FIG. 9. In order to reduce the computation time, the vertical shift values are typically determined on every five pixels along the rib edges in the mirror image.

Fitting of the Vertical Shift Values to a 2-D Polynomial

Figure 10:
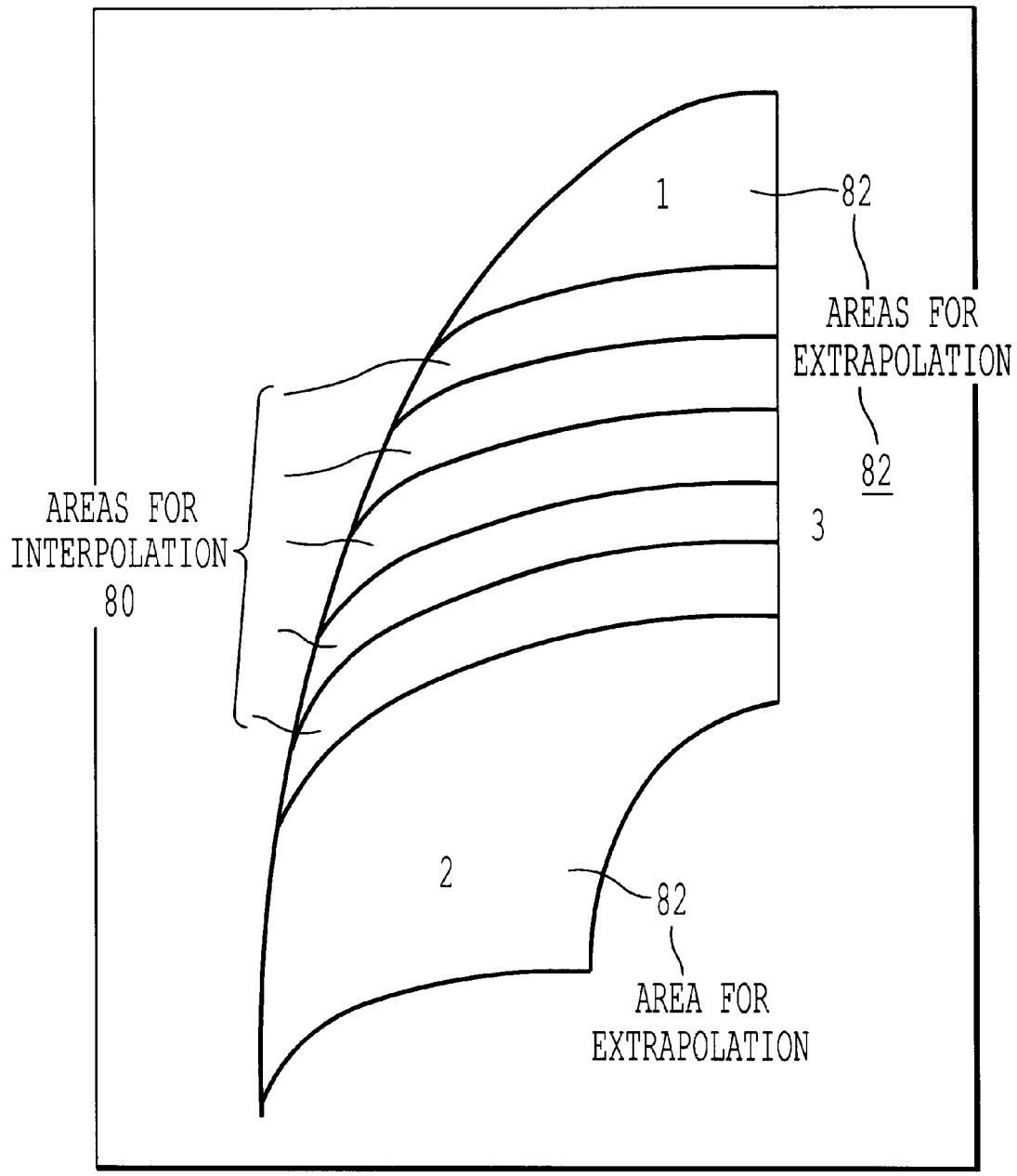
FIG. 10 is a diagram illustrating areas for interpolation and extrapolation of vertical shift values by fitting a 2-D third order polynomial to vertical shift values on rib edges in a mirror image.

Fitting of the vertical shift values for points on the rib edges of the mirror image typically has three purposes. The first is to smooth the variation involved in the shift values. The second is to interpolate the shift values for all pixels between the detected rib edges, and the third is the extrapolation of the shift values outside the area with detected rib edges. FIG. 10 is a schematic illustration of six delineated ribs and two different areas 80 and 82 for interpolation and extrapolation. For typically good results, a plausible functional form is necessary for the fitting of vertical shift values. A third order polynomial was selected for fitting, because high order polynomials usually oscillate strongly in the interpolation areas between the known points and typically can be erroneous in the extrapolation areas beyond these points.[19] A least square method is used to determine the coefficients of the polynomial.[19] The fitting procedure for the vertical shift values is applied independently to each of the two lungs in the mirror image. The interpolation and extrapolation techniques, which are described below are also implemented independently on the two lungs.

Once the coefficients of the polynomial have been obtained, the determined polynomial is employed to warp the mirror image by shifting all pixels only in the vertical direction. Whereas the vertical shift values computed from the polynomial in the interpolation areas are typically quite reliable and are typically used directly, the shift values based on the extrapolation for those pixels far away from the known points typically can be very erroneous, even though a relatively low order polynomial is employed.[19] Therefore, the extrapolated shift values are used directly only for pixels in extrapolation areas 1 and 2 in FIG. 10, and the shift values for pixels in area 3, which are typically 20 pixels away from the lung regions, are set to zero. The shift values for other pixels in area 3 change gradually from the extrapolated values to zero, inversely proportional to the distance from the lung region. FIGS. 4(a) and (b) show the chest image with asymmetric ribs and a mirror image thereof, respectively, and FIG. 4(c) shows the warped mirror image by use of the technique described above. It is apparent that the rib structures in the warped mirror image are very similar to those in the original image.

Image Warping by Use of an Elastic Matching Technique

Figure 11:
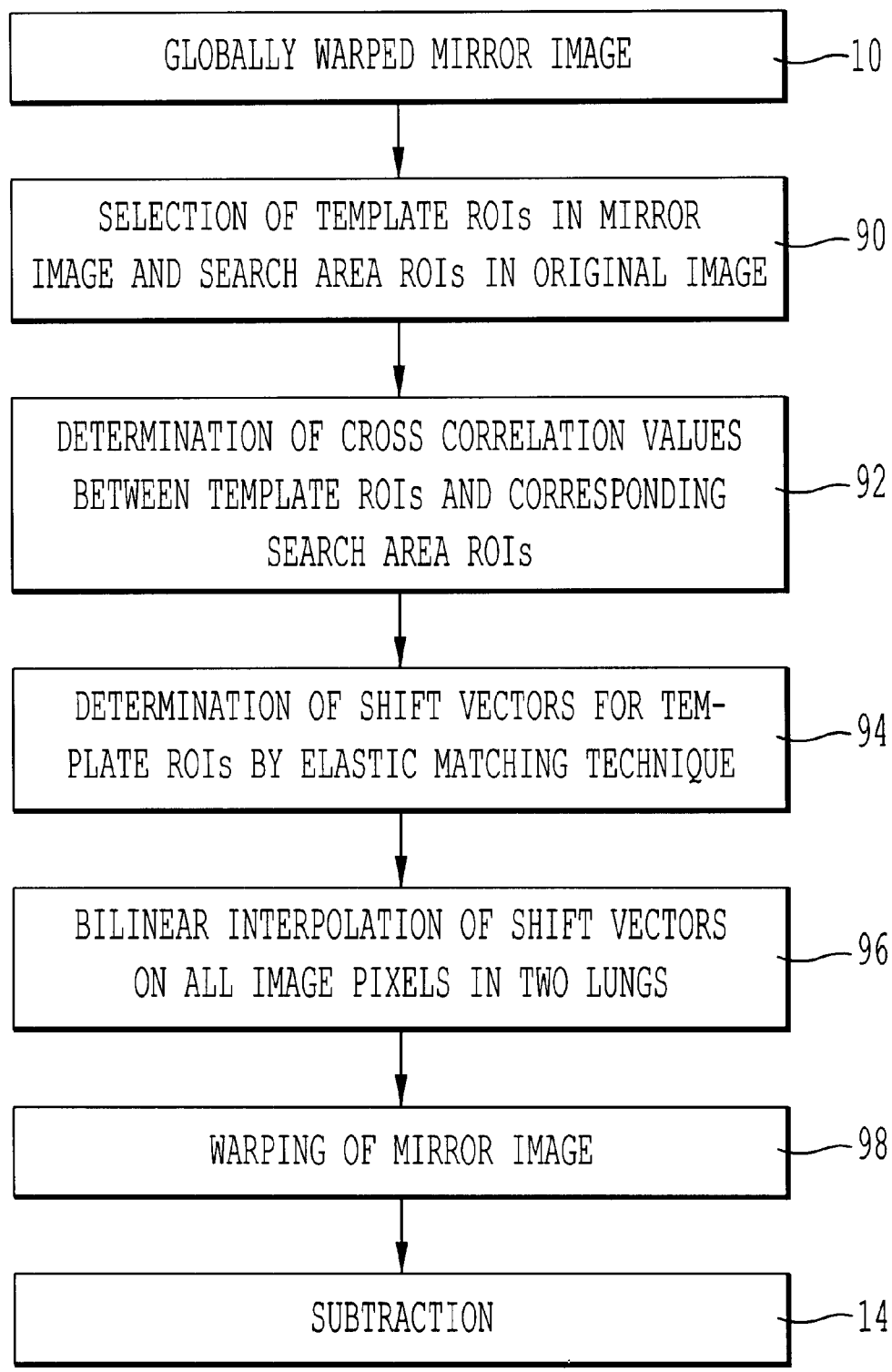
FIG. 11 is a flowchart illustrating a basic scheme of an elastic matching technique for accurate registration of local rib structures.

FIG. 11 shows the scheme for the elastic matching technique employed in the present invention. The major difference between the matching technique of the present invention and a previous technique [1] is that the "local" smoothness or consistency between the adjacent shift vectors is utilized to reduce some errors or inconsistencies, and to maintain local variations in the "correct" shift vectors. In the previous technique, a polynomial is employed to fit all shift vectors over the entire lungs, thus eliminating small local variations even in the "correct" shift vectors, and minor misregistration artifacts are often observed near the rib edges in the subtraction images. In order to achieve accurate matching between the original and the mirror images, an iterative image warping technique [20] was used previously to match the two images. In the present invention, two iterations are employed. The first is performed on images minimized by a factor of two in order to reduce the computational time, and the second is performed on the original images. It was discovered that the quality of the subtraction images obtained with the two iterations is generally slightly superior to that obtained without the iterative image warping technique.

Selection of Template ROIs in the Mirror Image and Search Area ROIs in the Original Image The template and the search area ROIs are automatically located within the lung regions in the original and the mirror images (step 90), respectively, typically in the same way as those ROIs were determined by the previous subtraction techniques.[1, 21] The matrix sizes of the template ROIs and the search area ROIs are 16×16 and 32×32, respectively, in the first iteration, and, 32×32 and 64×64, respectively, in the second iteration. The distances between the adjacent ROIs are 4 and 8 pixels in the first and the second iterations, respectively.

Determination of Cross Correlation Values Between Template ROIs and Search Area ROIs A cross correlation technique is employed (step 92) to determine the similarities between the template ROIs and the search area ROIs, typically as was used in the previous subtraction techniques.[1, 21] The shift vector indicates a shift in the location of a template ROI to be matched with a local pattern included in the search area ROI 104 (FIG. 12), and a correlation value indicates the extent of the similarity between the two patterns. In the present invention, an array of correlation values for a given template ROI is obtained to determine the final shift vector by applying the elastic matching technique, whereas in the previous subtraction techniques [1, 21] only the shift vector with the maximum correlation value for each template ROI was utilized to determine the final shift vectors over the lungs. Because the shift vector with the maximum correlation value is not necessarily the "correct" one, the use of only one shift vector has a risk of discarding other shift vectors, which may have nearly the same large values as the maximum value, and which may potentially be the correct one if the local consistency between the shift vectors is taken into account.

Determination of Shift Vectors for Template ROIs by Use of Elastic Matching Technique Implemented by a Greedy Algorithm In the previous subtraction technique, the final shift values, which are two components of a shift vector, were determined by fitting each of two 2-D "global" polynomials independently to x and y shift values with the maximum cross correlation values for all template ROIs in each lung. In this previous global fitting technique, it is difficult to adjust for minor variations of the "correct" shift values in a "local" area, and the shift values with the maximum correlation values may be potentially incorrect. In addition, errors in these shift values are likely to affect the quality of the subtraction images. To solve this problem, an elastic matching technique is employed in the present invention, in which the cross correlation values and the consistency between local shift vectors are considered simultaneously (step 94).

The elastic matching technique is conceptually similar to the snake model technique [3–5] described in a previous section. With the elastic matching technique, the shift vector for each ROI is changed in an iterative manner according to two measures. [6–9] For a given template ROI, the first measure, or internal energy, is to examine the consistency (i.e., smoothness) of the local shift vectors, which is given here by the squared sum of the first and the second derivatives over the local shift vectors. The smoother the local shift vectors, the smaller the internal energy. The second measure or external energy is equal to the negative value of the cross correlation so that a shift vector with a large correlation value provides a small external energy. The local energy for a given template ROI is defined as the weighted sum of the internal and the external energy. The objective for the elastic matching technique is to minimize the total energy over the entire lungs, which is given by the sum of the local energies for all template ROIs.

Figure 12:
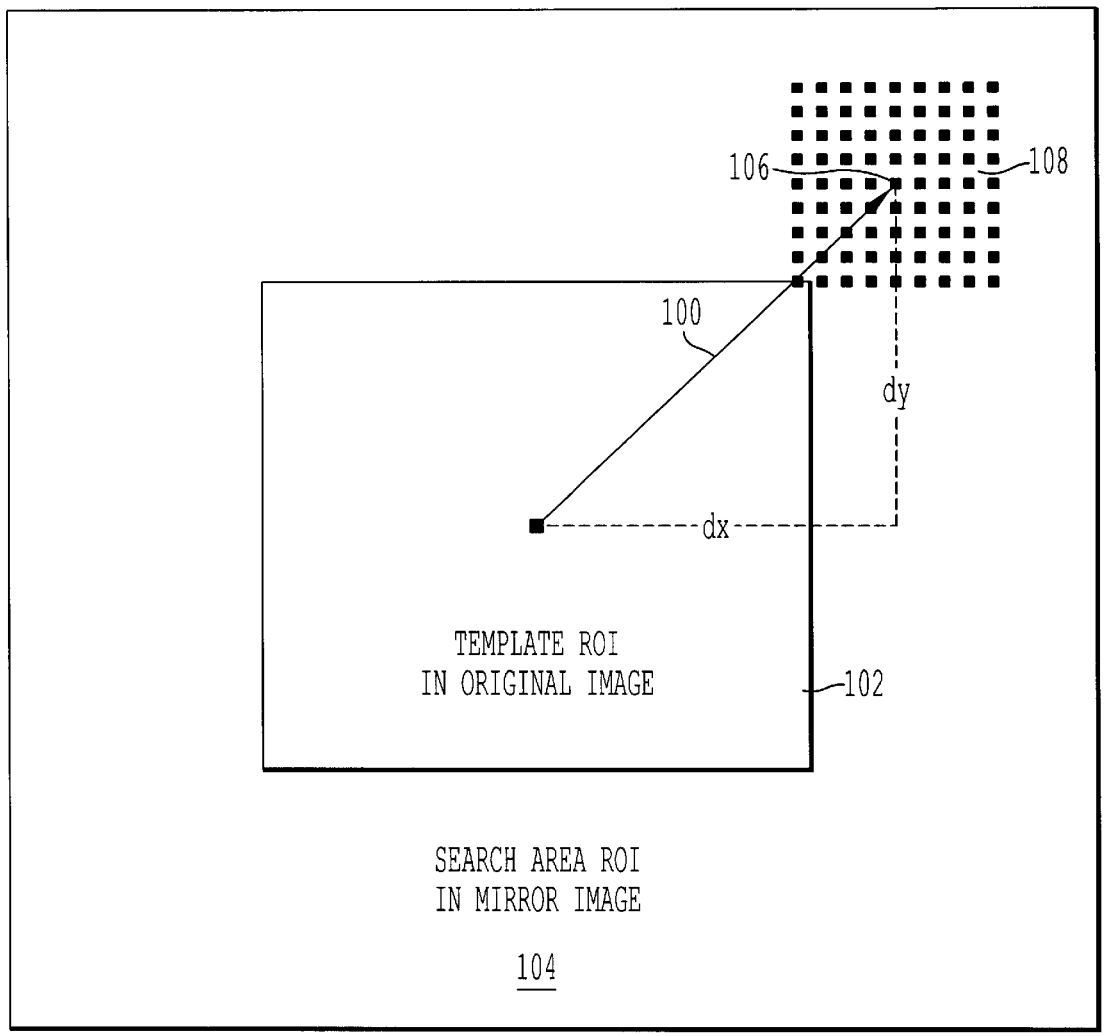
FIG. 12 is a diagram illustrating a template ROI, a search area ROI, and an initial shift vector with a 9×9 region from which an updated "new" shift vector is determined by a Greedy Algorithm for an elastic matching technique.
Figure 13A:
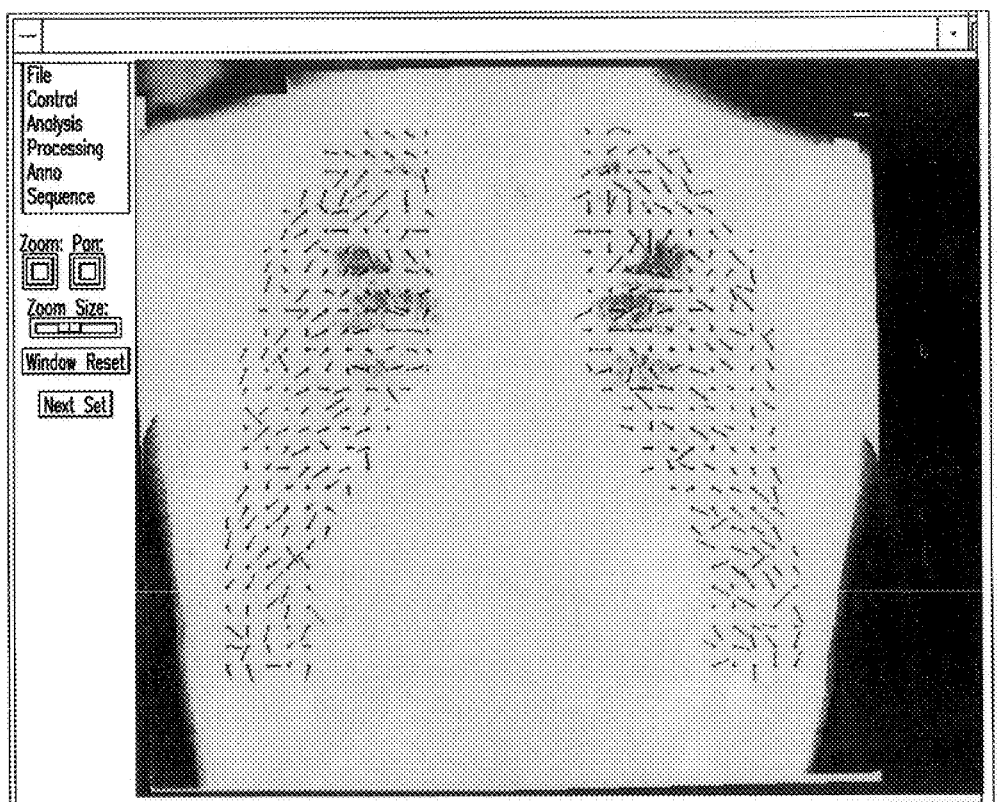
FIGS. 13(a)–(d) are diagrams illustrating (a)–(c) a comparison of distribution of shift vectors in two lungs at three different iterations (1, 3, and 7) obtained with an elastic matching technique, and (d) a contralateral subtraction image obtained by subtracting a mirror image warped by the elastic matching technique from an original image.
Figure 13B:
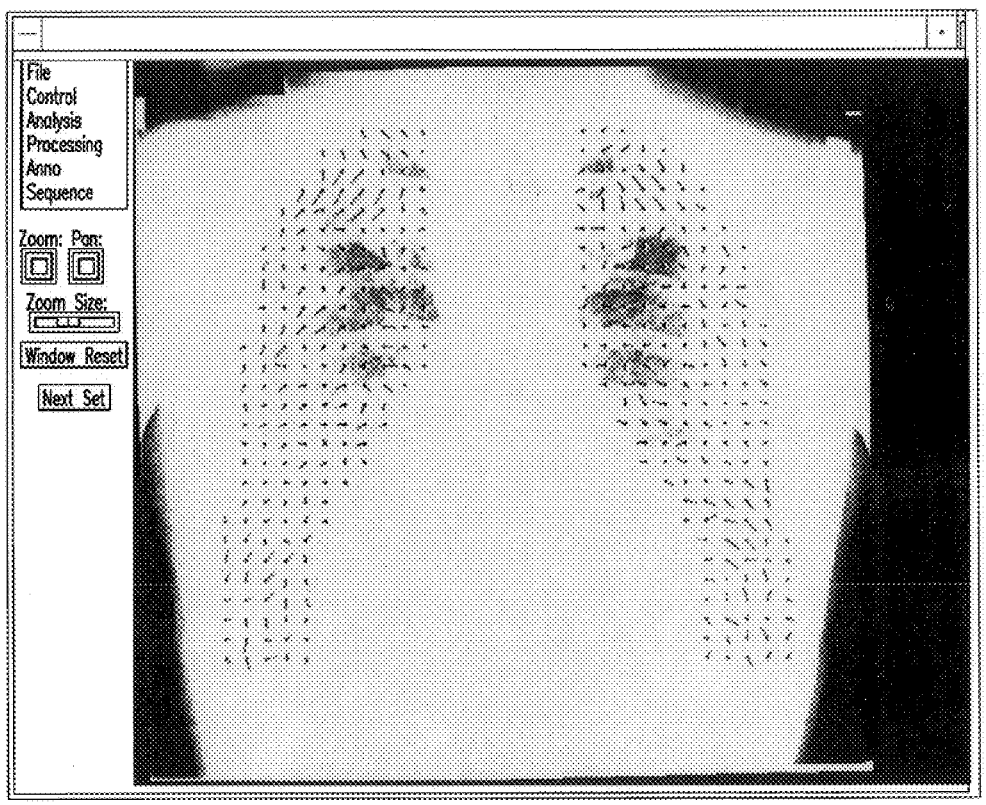
Figure 13C:
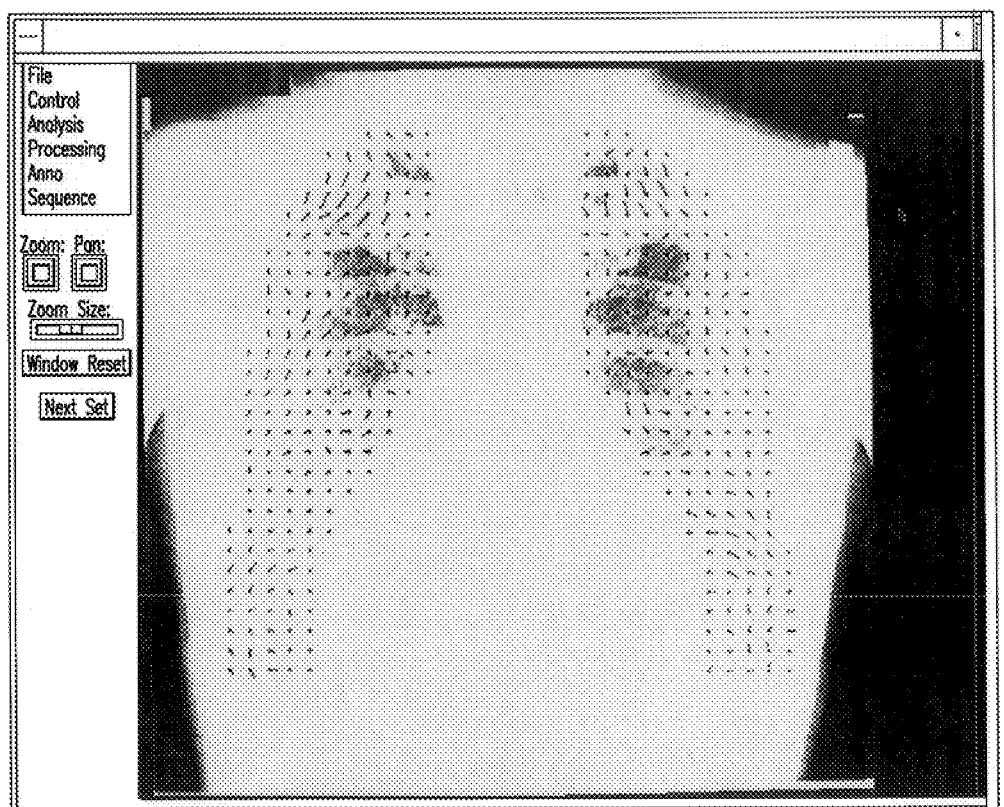
Figure 13D:
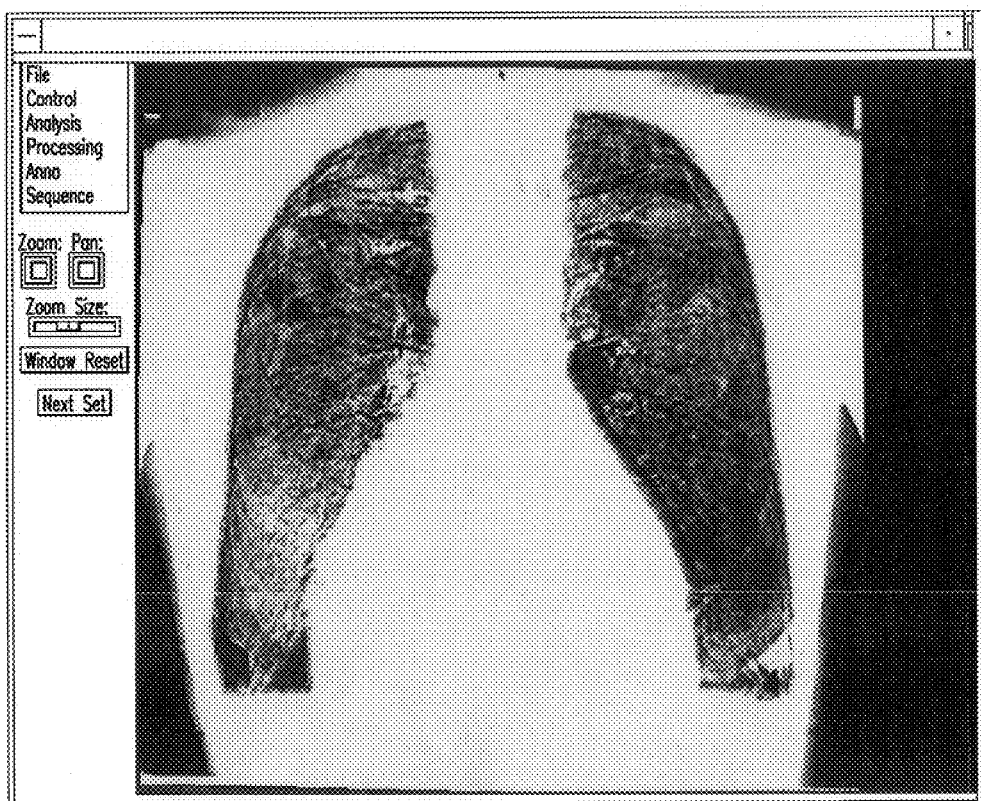

The initial shift vector for each ROI can be selected arbitrarily, and in the present invention the initial shift vector is assigned with the one with the maximum correlation value. The shift vectors are then updated by use of a Greedy Algorithm. [5] The shift vector for a template ROI is assumed to be represented by a 2-D vector (dx, dy) 100, as illustrated in FIG. 12. With the Greedy Algorithm, the new shift vector for that template ROI is selected as the one with the minimum local energy from an NxN area 108 around the point (dx, dy) 106. In the present invention, N was determined empirically to be nine. FIG. 12 is a schematic illustration of the current shift vector (dx, dy) 100 and, for example, a 9×9 area 108. This procedure is applied to each of the template ROIs 102 for an update of the shift vectors, and is repeated several times over the entire lungs until no more than one percent of shift vectors in all ROIs are updated.

FIGS. 13(*a*), (*b*), and (*c*) show the distributions of shift vectors over the two lungs obtained with three different iterations, namely, 1, 3, and 7, for the two images shown in FIGS. 4(*a*) and (*c*). It is apparent that some of the erroneous shift vectors in the first iteration are gradually smoothed by the elastic matching technique. It is also apparent in FIG. 13(*c*) that the local variations in the "correct" shift vectors are preserved, i.e., the distribution of shift vectors around the clavicles is quite different from those in the adjacent lung areas.

Once the final shift vectors for all ROIs are obtained, a bilinear interpolation image processing technique [16] (FIG. 11, step 96) is employed to determine the shift vectors for all pixels over the entire lung regions. The interpolated shift vectors were then used to warp the lung regions in the mirror image (FIG. 11, step 98). Finally, the lung regions in the warped mirror image are subtracted (FIGS. 1 and 11, step 14) from those in the original image to provide the contralateral subtraction image in the lung regions (FIG. 1, step 16).[1]

In order to display the contralateral subtraction images, the original chest image outside the lung regions is kept in the subtraction image to maintain the general appearance of a "chest" background, as described in the previous contralateral subtraction technique. [1] FIG. 13(*d*) shows the contralateral subtraction image for the chest image shown in FIG. 4(*a*). It is important to note that the asymmetric clavicles in the two lungs in the original image are well registered and thus disappear in the subtraction image.

Subjective Evaluation of the Quality of the Subtraction Image

For subjective evaluation of the quality of the contralateral subtraction image, a five-point rating score [1, 20] is employed in the present invention:

5 (excellent): All ribs are perfectly registered (and thus eliminated)
4 (good): Most ribs are almost completely registered, with very minor misregistration errors
3 (adequate): Most ribs are well registered, with some minor misregistration errors
2 (poor): Most ribs are not well registered and appear in half of the intercostal space,
1 (very poor): Most ribs are not registered and appear in the entire intercostal space.

Although vascular markings also contribute to the misregistration errors, the scoring is based only on the registration of ribs, because the ribs are relatively large and are the main factor in the assessment of the quality of the subtraction images. Another rating method is used for examining the change in the quality of the subtraction image due to the use of the new elastic matching technique compared with the previous technique. The rating score for the quality of the subtraction image ranges from −2 to +2, as follows:

+2: clearly improved,
+1: moderately improved,
0: unchanged,
−1: moderately degraded,
−2: clearly degraded.

RESULTS

Figure 14A:
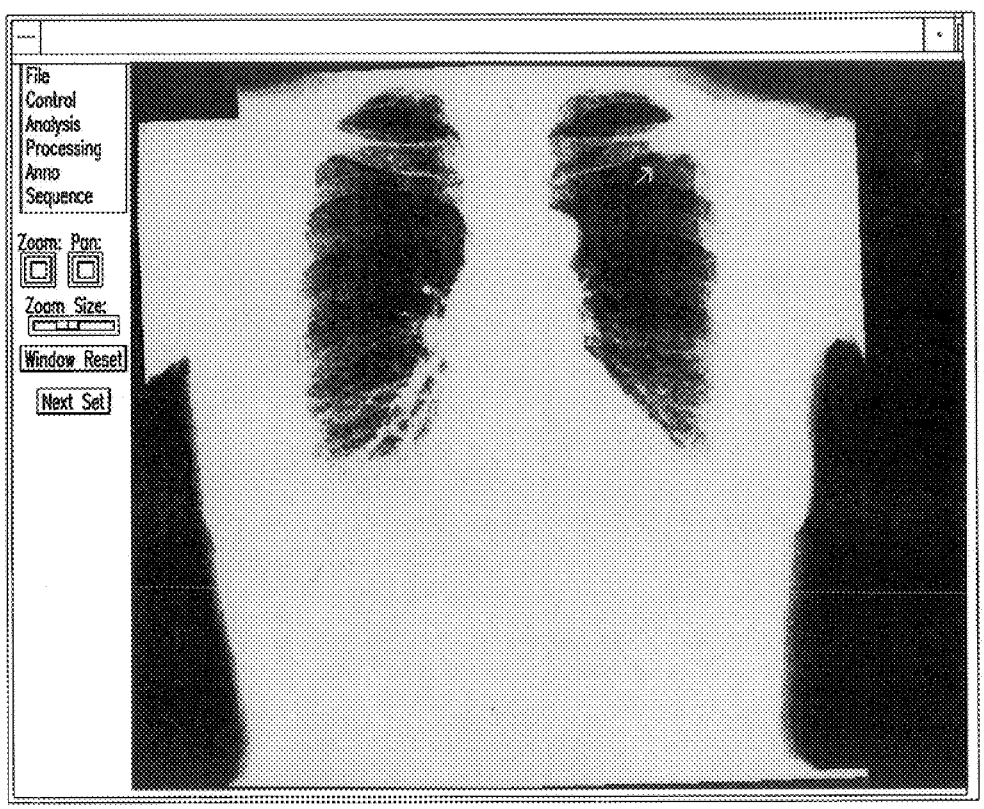
FIGS. 14(a)–(d) are images illustrating a comparison of (a) an original chest image with a lung nodule indicated by an arrow, (b) a mirror image, and (c)–(d) contralateral subtraction images obtained with an elastic matching technique without and with initial image warping for global matching of rib structures, respectively, wherein the nodule overlapped with a clavicle and ribs is enhanced in the subtraction image because skeletal structures are eliminated.
Figure 14B:
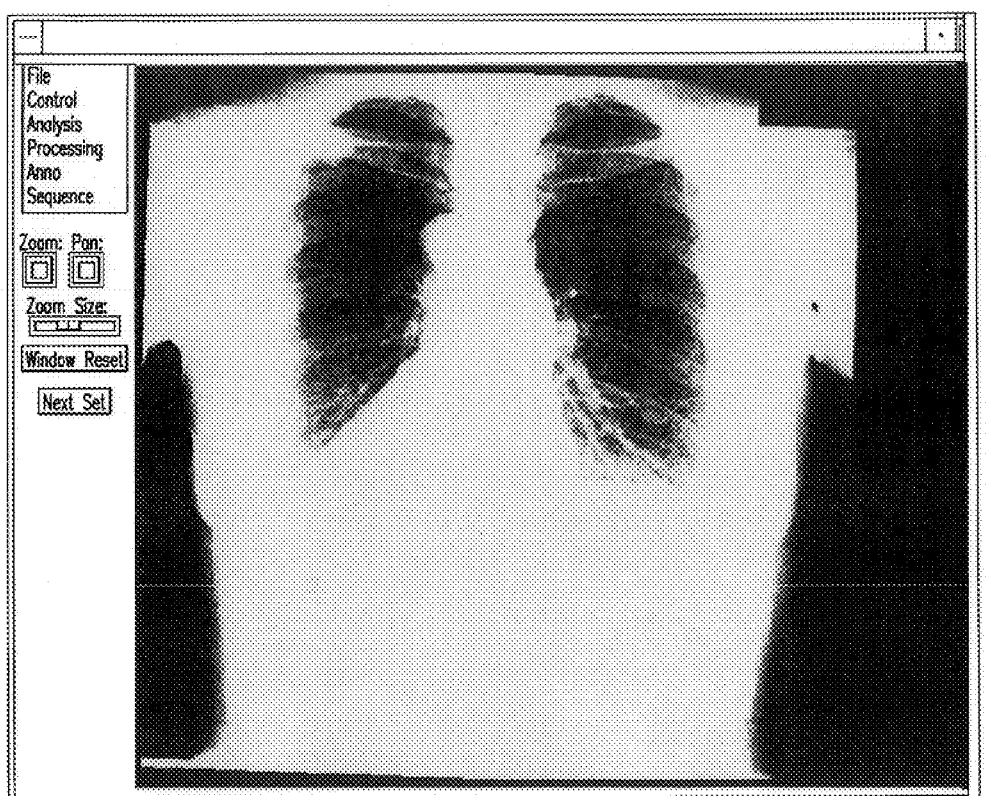
Figure 14C:
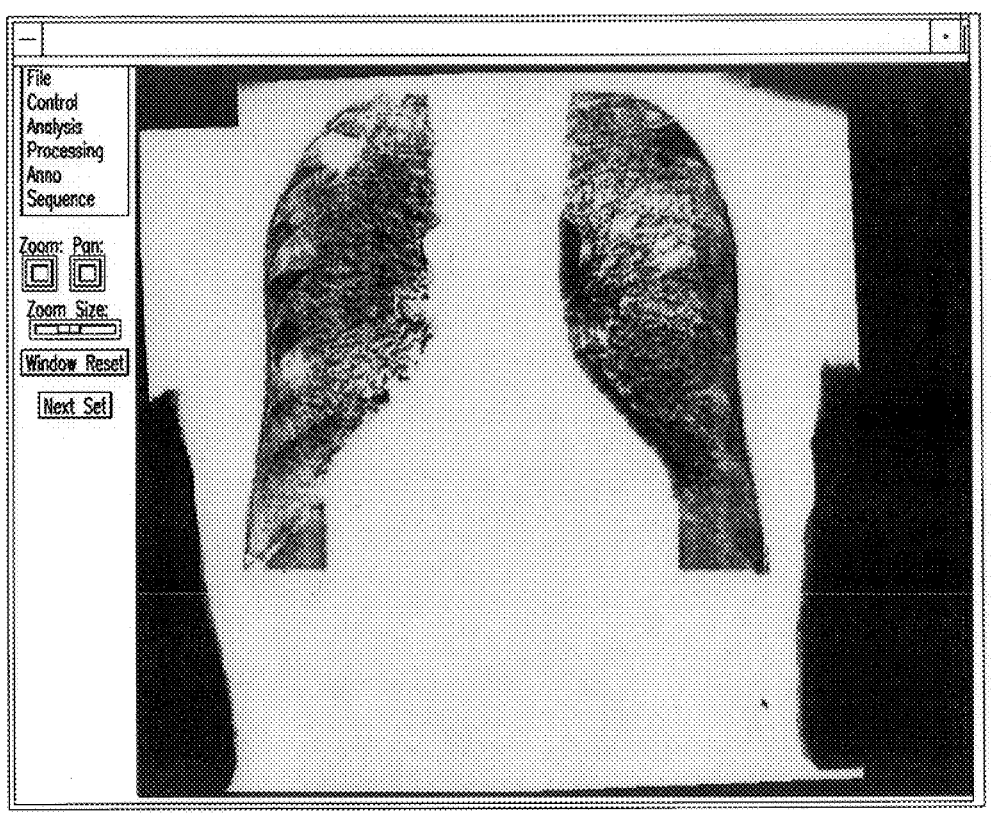
Figure 14D:
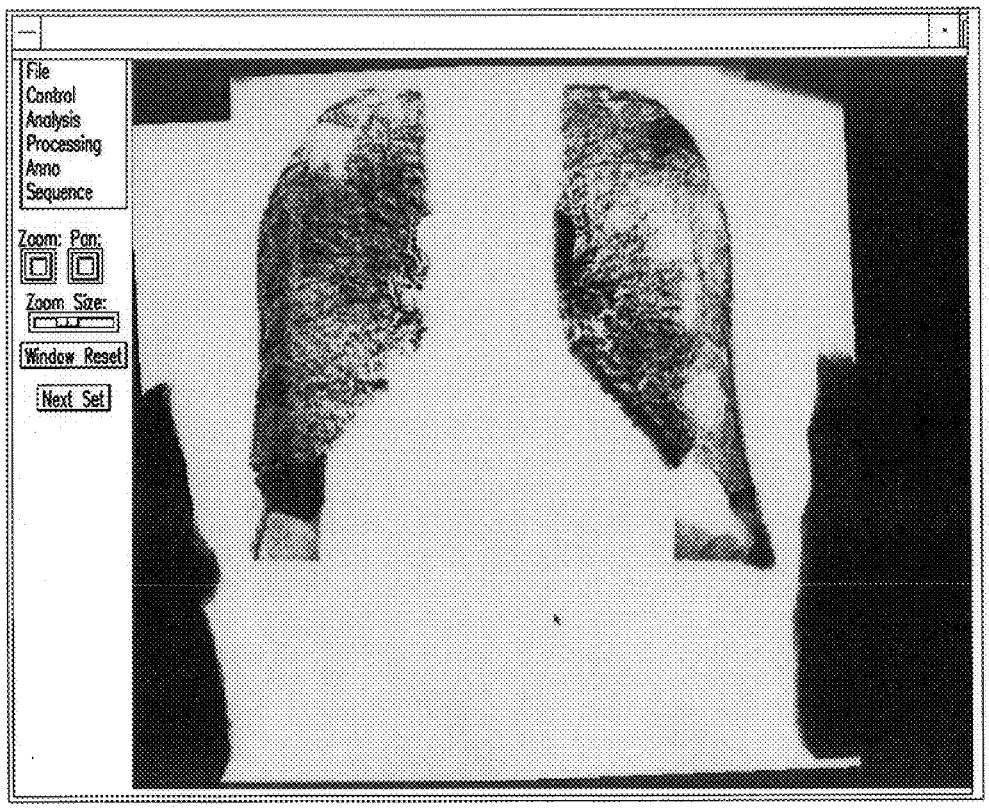

FIG. 14(a) shows an original chest image with a nodule on the left lung as indicated by an arrow, and FIG. 14(b) shows the mirror image. It is very difficult to identify the nodule because of overlap thereof with the clavicle and ribs. FIGS. 14(c) and (d) illustrate the contralateral subtraction images obtained with the elastic matching technique without and with initial image warping for global matching of rib structures in the original and in the mirror image, respectively. Note that the nodule is enhanced, and the nodule appears as a dark shadow on the ipsilateral side and a bright shadow on the contralateral side. It is apparent that major misregistration errors in the right peripheral lung in FIG. 14(c), which are typically mainly due to serious rib asymmetry on the two lungs of the original image, are eliminated in FIG. 14(d) by use of the initial image warping technique.

Figure 15A:
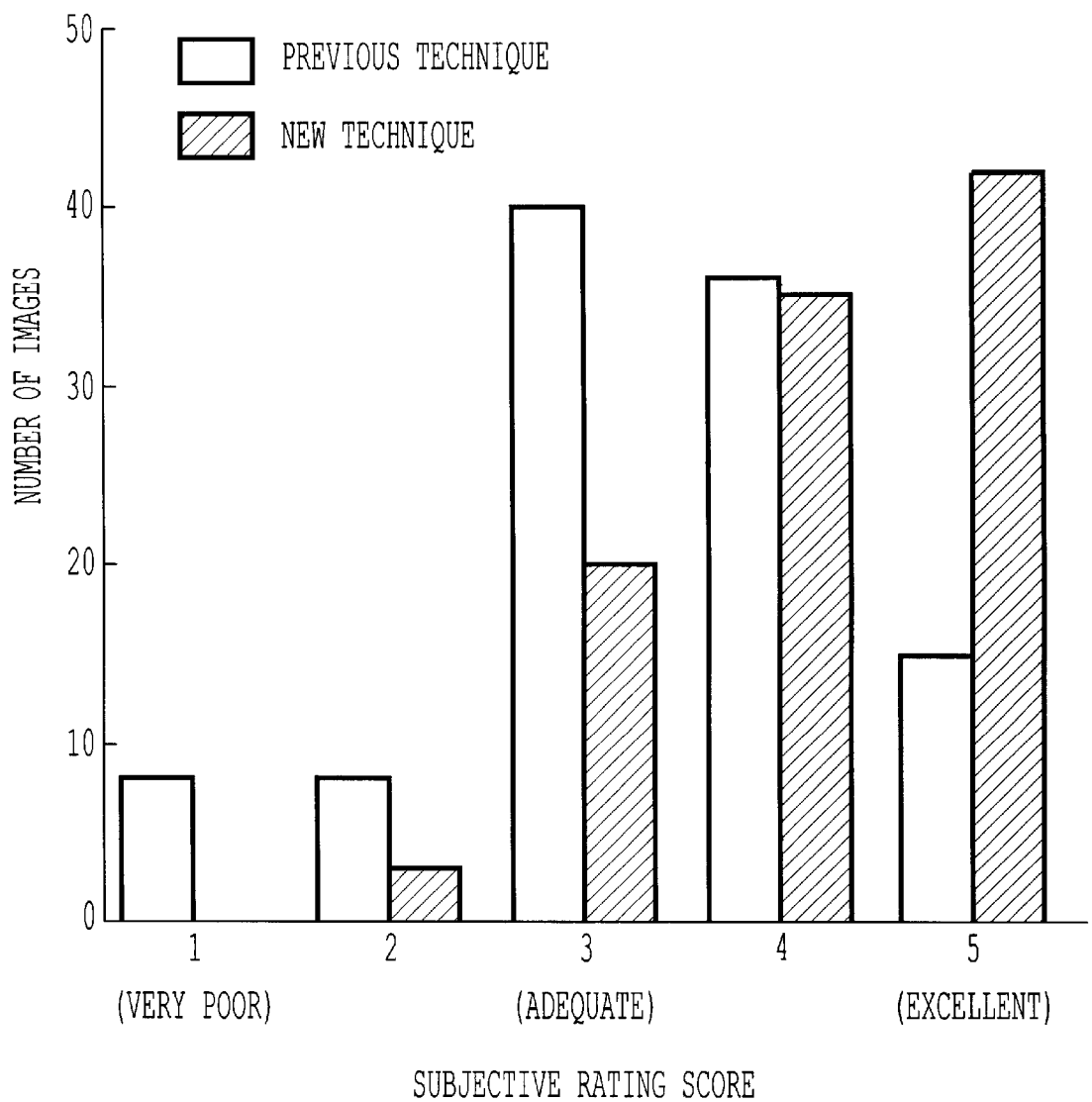
FIGS. 15(a)–(b) are graphs illustrating (a) a distribution of numbers of chest images with different subjective rating scores on a quality of contralateral subtraction images obtained with previous techniques and the techniques of the present invention, and (b) a distribution of numbers of chest images affected by the techniques of the present invention in terms of subjective rating scores on a quality of contralateral subtraction images.
Figure 15B:
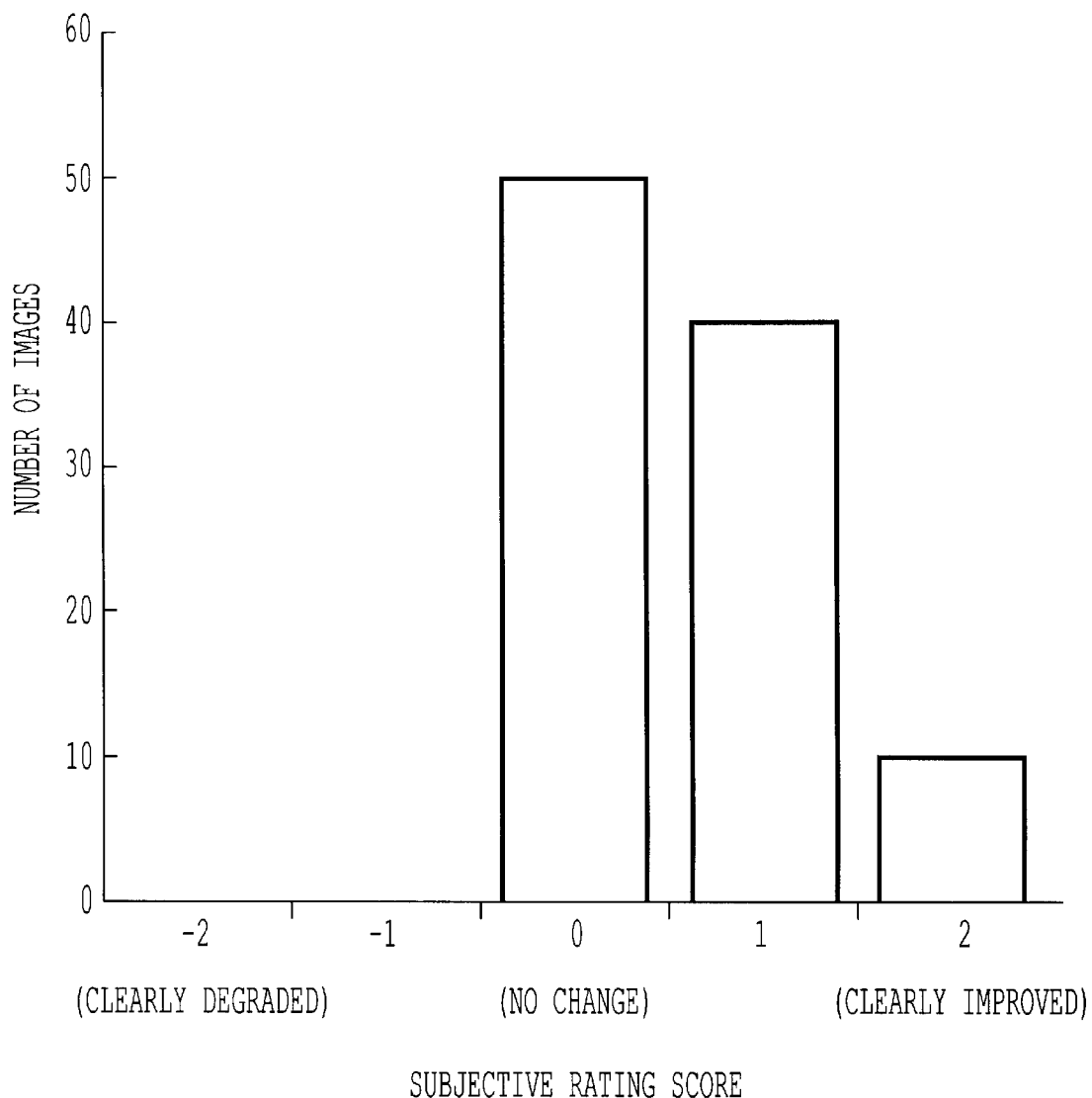

FIG. 15(a) shows the distributions of the number of cases for different subjective rating scores for the quality of subtraction images, which were obtained by the previous technique [1] and by the elastic matching technique described in the present invention. With the elastic matching technique, the number of subtraction images with adequate, good, and excellent quality improved from 91 (91%) to 96 (96%). It is important to note that the number of subtraction images with excellent quality increased from 15 (15%) to 42 (42%). FIG. 15(b) shows the distribution of the number of cases for the change in subjective rating scores for the quality of subtraction images with the use of the new technique. It is important to note in FIG. 15(b) that about half of the subtraction images are improved, and that none are degraded, by use of the elastic matching technique.

Application of the Elastic Matching Technique to Temporal Subtraction Technique

Figure 16:
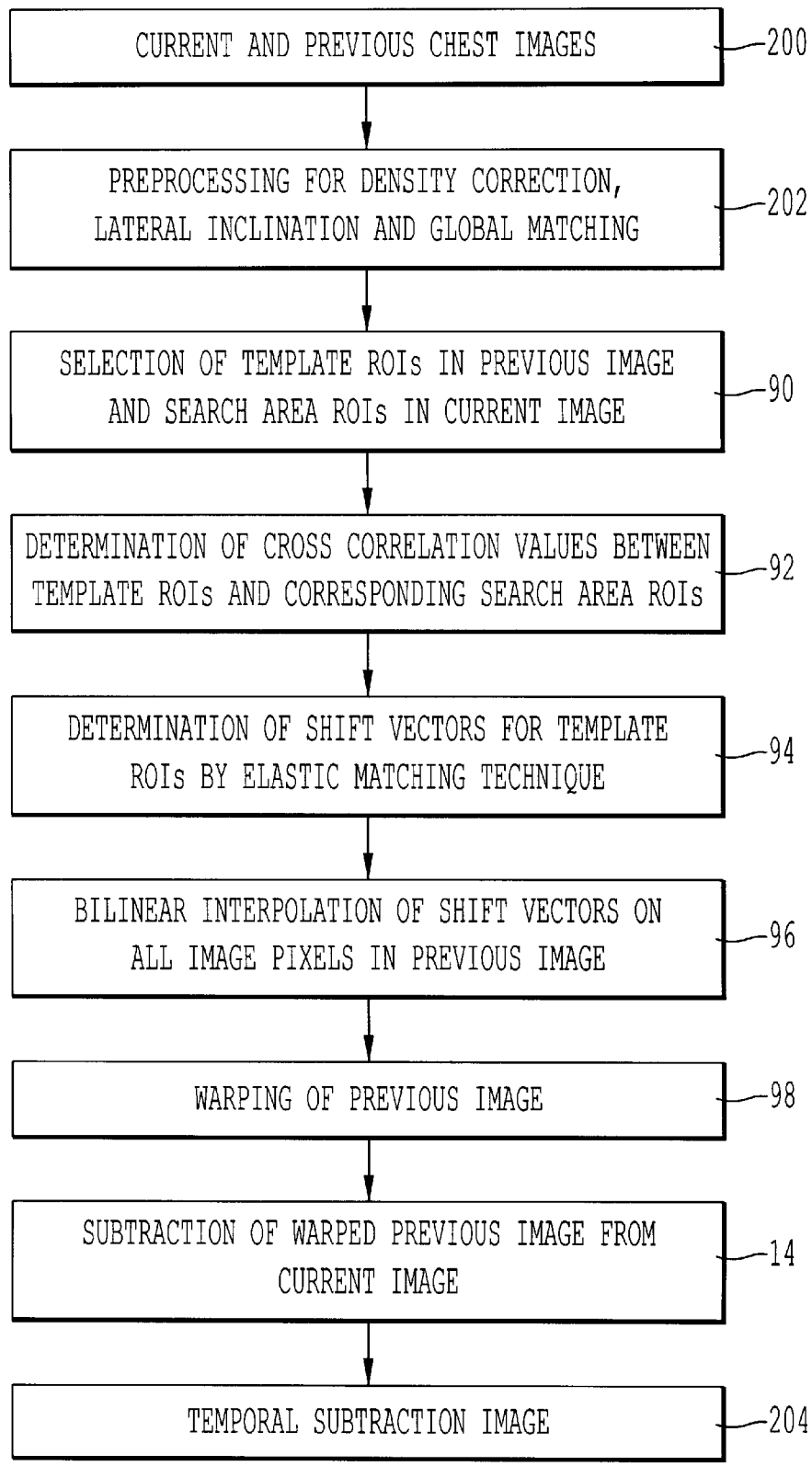
FIG. 16 is a flowchart illustrating an overall scheme of a temporal subtraction technique for PA chest images based on an elastic matching technique.

The elastic matching technique can be applied to improve the quality of temporal subtraction images which are obtained by subtraction of a warped previous chest image from a current chest image. In a previous study,[1, 20–22] it has been shown that the temporal subtraction technique is useful in detecting interval changes in chest radiographs. A nonlinear image warping technique [22] was employed to match the previous image with the current image (FIG. 16, step 200). As a preprocessing step, three techniques, which included the normalization (or correction) of density and contrast of chest radiographs,[23] the correction of lateral inclination by image rotation, [1] and the initial image matching by determination of global shift values using a cross correlation technique [22] were used (FIG. 16, step 202). In addition, an iterative image warping technique was implemented to improve the quality of temporal subtraction images.

One of the important steps in the previous temporal subtraction technique is to determine shift vectors (or two shift values, $\Delta x$ and $\Delta y$, in Cartesian coordinates) by using a high-order polynomial function.[21] This step can be replaced by the elastic matching technique described in the present invention. FIG. 16 shows the overall scheme for the new temporal subtraction technique which incorporates the elastic matching technique (steps 90–98) of the present invention. As a preprocessing step, the density and contrast of the previous chest image is adjusted to be comparable to those of the current chest image; [23] the lateral inclination of two chest images are corrected; [1] and the approximate location of the lungs in the two chest images are globally matched by using the initial image matching technique (step 202). [22] This initial image matching technique can be replaced by the present global matching technique based on the Hough transform and snake model techniques of the present invention, applied to the current and previous images to detect rib edges therein.

Then, using the present local image matching based on the elastic matching technique of the present invention, template ROIs in the previous image and the corresponding search area ROIs in the current image are selected automatically in each lung field (step 90). Cross correlation values and the corresponding shift vectors are then determined for each pair of the template ROI and the corresponding search area ROI (step 92). Shift vectors for template ROIs are determined by using the elastic matching technique with the Greedy Algorithm (step 94). Then shift vectors on all pixels in the previous image are obtained by means of a bilinear interpolation image processing technique [16] (step 96). Subsequently the previous chest image is warped (step 98), and the temporal subtraction image is obtained (step 204) by subtracting the warped previous image from the current chest image (step 14). In a preliminary study on ten pairs of current and previous chest images, it was found that the quality of temporal subtraction images obtained with the new scheme of the present invention using the elastic matching technique was noticeably improved by reducing misregistration artifacts in some cases, in comparison with that obtained with the previous scheme using the 10th order polynomial function for fitting shift values.

Recapitulating, according to the present invention, the initial warping technique for global matching and the elastic matching technique for local matching of rib structures in the original and the mirror images are very effective in improving the quality of the contralateral subtraction image. The new contralateral subtraction technique of the present invention typically removes most of the peripheral ribs, and thus enhances low-contrast peripheral lesions on chest radiographs. Accordingly, the technique of the present invention has the potential to assist radiologists in the detection of subtle lung opacities in peripheral lungs in chest images.

The mechanisms and processes set forth in the present description may be implemented using a conventional general purpose microprocessor or computer programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits.

The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

The programming of the general purpose microprocessor or computer may include a software module for digitizing and storing images obtained from an image acquisition device (not shown). Alternatively, the present invention can also be implemented to process digital data derived from images obtained by other means, such as a picture archive communication system (PACS). In other words, often the digital images being processed are in existence in digital form and need not be converted to digital form in practicing the invention.

Obviously, numerous modifications and variations of the present invention are possible in light of the above teachings. It is therefore to be understood that within the scope of the appended claims, the invention may be practiced otherwise than as specifically described herein.

APPENDIX

[1]. Q. Li, S. Katsuragawa, T. Ishida, H. Yoshida, S. Tsukuda, H. MacMahon, K. Doi, "Contralateral subtraction: a novel technique for detection of asymmetric abnormalities on digital chest radiograph," Med. Phys (in press); and K. Doi, Q. Li, S. Katsuragawa, T. Ishida, "Contralateral subtraction technique for detection of subtle lung nodules on chest radiographs," U.S. provisional patent application No. 60/107,095, pending.

[2]. D. H. Ballard, "Generalizing the Hough transform to detect arbitrary shapes," Pattern Recognition 13, 111–122, 1981.

[3]. M. Kass, A. Witkin, D. Terzopoulos, "Snakes: Active contour models," Proc. of First International Conference on Computer Vision, 1987, 259–268.

[4]. A. A. Amini, T. E. Weymouth, R. C. Jain, "Using dynamic programming for solving variational problems in vision," IEEE Trans. Pattern Recognition and Machine Intelligence 12, 855–867, 1990.

[5]. D. J. William, M. Shak, "A fast algorithm for active contours and curvature estimation," Computer Vision, Graphics, Image Processing: Image Understanding 55. 14–26. 1992.

[6]. A. Tikhonov, V. Arsenin, Solutions of ill-posed problem, Winston, Washington D.C., 1977.

[7]. R. Bajscy, C. Broit, "Matching of deformed images," Proc. of 6th International Conference on Pattern Recognition, 351–353, 1982.

[8]. R. Bajscy, S. Kovacic, "Multiresolution elastic matching," Computer Vision, Graphics, Image Processing 46, 1–21, 1989.

[9]. D. Terzopolous, A. Witkin, M. Kass, "Energy constraints on deformable models: Recovering shape and non-rigid motion," Proc. of American Association of Artificial Intelligence 2, 755–760, 1987.

[10]. J. Shiraishi, S. Katsuragawa, J. Ikezoe, T. Matsumoto, T. Kobayashi, K. Doi, et al, "Development of digital image database for chest radiographs with lung nodules: Evaluation by ROC analysis", Radiology 205(p), 394, 1997.

[11]. X. W. Xu, K. Doi, "Image feature analysis for computer-aided diagnosis: Accurate determination of ribcage boundary in chest radiographs," Med. Phys. 22, 617–626 (1995).

[12]. S. Sanada, K. Doi, H. MacMahon, "Image feature analysis and computer-aided diagnosis in digital radiography: Automated delineation of posterior ribs in chest images," Med. Phys. 18, 964–971, 1991.

[13]. Z. Yue, Y. Goshitasby, L. Ackerman, "Automatic detection of rib borders in chest radiographs," IEEE Trans. Med. Imag. 14, 525–536, 1995.

[14]. D. Ballard, C. Brown, Computer vision, Englewood Cliffs, N.J., Prentice-Hall, 1982.

[15]. L. S. Davis, "A survey of edge detection techniques," Computer Graphics and Image Processing 4, 248–270, 1975.

[16]. A. K. Jain, Fundamentals of digital image processing, Prentice-Hall International, Inc., Eaglewood Cliffs, N.J., 253–255, 1989.

[17]. L. D. Cohen, I. Cohen, "Finite element methods for active contour models and balloons for 2-D and 3-D images," IEEE Transaction on Pattern Recognition and Machine Intelligence 15, 1131–1147, 1993.

[18]. F. Leymarie, M. Levine, "Tracking deformable objects in the plane using an active contour model," IEEE Transaction on Pattern Recognition and Machine Intelligence 15, 635646, 1993.

[19]. W. H. Press, B. Flannery, S. Teukosky, W. Vetterling, Numerical Recipes, Cambridge University Press, Cambridge, 1986.

[20]. T. Ishida, S. Katsuragawa, K. Nakamura, H. MacMahon, K. Doi, "Iterative image warping technique for temporal subtraction of sequential chest radiographs to detect interval change," Med. Phys. 26, 1320–1329, 1999; and T. Ishida, S. Katsuragawa, K. Doi, "Iterative image warping technique for temporal subtraction of chest radiographs," U.S. patent application Ser. No. 09/053, 798, pending.

[21]. A. Kano, K. Doi, H. MacMahon, D. D. Hassel, M. Giger, "Digital image subtraction of temporally sequential chest images for detection of interval change," Med. Phys. 21, 453461 (1994); and A. Kano, K. Doi, "Method and system for detection of interval change in temporally sequential chest images," U.S. Pat. No. 5,359,513, 1994.

[22]. T. Ishida, K. Ashizawa, R. Engelmann, S. Katsuragawa, H. MacMahon, K. Doi, "Application of temporal subtraction for detection of interval change in chest radiographs: Improvement of subtraction images using automatic initial image matching," J. of Digital Imaging 12, 77–86, 1999; and K. Doi, T. Ishida, S. Katsuragawa, "Method for temporal subtraction of chest images for detection of interval changes," U.S. patent application Ser. No. 08/900,362, pending.

[23]. H. Yoshimura, X. W. Xu, K. Doi, H. MacMahon, K. R. Hoffmann, M. L. Giger, S. M. Montner, "Development of a high quality film duplication system using a laser digitizer: Comparison with computed radiography," Med. Phys. 20, 51–58, 1993; and K. Doi, H. Yoshimura, "High quality film image correction duplication method and system," U.S. Pat. No. 5,224,177, 1993.

What is claimed as new and desired to be secured by Letters Patent of the United States is:

1. A method of computerized processing of chest images, comprising:

obtaining digital first and second images of a chest;

detecting internal rib edges of ribs located interior of a rib cage and overlaying a lung in at least one of said first and second images, comprising, correlating points in said at least one of said first and second images to plural rib edge models using a generalized Hough transform to identify approximate internal rib edges in said one of said images, and delineating actual internal rib edges derived from the identified approximate internal rib edges using a snake model;

deriving shift values using said actual internal rib edges; and warping one of said first and second images to produce a warped image which is registered to an other of said first and second images based at least in part on said shift values.

2. The method of claim 1, further comprising subtracting said warped image from said other image to generate a subtraction image.

3. The method of claim 2, further comprising displaying the subtraction image.

4. The method of claim 1, wherein said step of deriving shift values comprises deriving global shift values; and said step of warping comprises producing a globally warped image which is registered to said other of said first and second images based at least in part on said global shift values.

5. The method of claim 4, wherein said step of warping comprises:

deriving local shift values from a difference between said globally warped image and a non-warped image; and locally warping said globally warped image to produce a locally warped image which is registered to said non-warped image using said local shift values.

6. The method of claim 4, wherein said step of deriving global shift values comprises:

determining correspondence of rib edges between said first and second images;

determining vertical shift values for points on rib edges in one of said first and second images; and fitting said vertical shift values to a two dimensional polynomial.

7. The method of claim 5, wherein said step of deriving local shift values comprises:

selecting template regions of interest (ROIs) in one of said globally warped image and said non-warped image and search area ROIs in the other of said globally warped image and said non-warped image;

determining cross correlation values between pixels in said template ROIs and said search area ROIs;

determining local shift vectors for said template ROIs, comprising, determining local shift vectors between pixels in said search ROIs relative to said template ROIs, determining internal and external energies based on smoothness of said local shift vectors and said cross correlation values, respectively, and modifying said local shift vectors based at least in part on said internal and external energies; and producing said local shift values based on said modified local shift vectors.

8. The method of claim 7, wherein said step of deriving local shift values further comprises performing bilinear interpolation on said modified local shift vectors on image pixels of two lungs of one of said first and second images.

9. The method of claim 1, further comprising performing edge enhancement on said at least one of said first and second images, prior to performing said step of correlating points.

10. The method of claim 1, wherein said step of obtaining digital first and second images comprises:

obtaining said digital first image; and obtaining as said second image a mirror image of said digital first image.

11. The method of claim 10, further comprising performing lateral inclination correction on said digital first image prior to obtaining said mirror image.

12. The method of claim 1, wherein said step of obtaining digital first and second images comprises obtaining temporally separated digital first and second images of a same chest.

13. The method of claim 12, further comprising performing lateral inclination correction on said temporally separated digital first and second images.

14. The method of claim 12, wherein said step of detecting rib edges comprises detecting actual rib edges in both of said temporally separated digital first and second images.

15. The method of claim 13, wherein said step of detecting rib edges comprises detecting actual rib edges in both of said temporally separated digital first and second images.

16. The method of claim 7, wherein said step of obtaining digital first and second images comprises:

obtaining said digital first image; and obtaining as said second image a mirror image of said digital first image.

17. The method of claim 16, further comprising performing lateral inclination correction on said digital first image prior to obtaining said mirror image.

18. The method of claim 7, wherein said step of obtaining digital first and second images comprises obtaining temporally separated digital first and second images of a same chest.

19. The method of claim 18, further comprising performing lateral inclination correction on said temporally separated digital first and second images.

20. The method of claim 18, wherein said step of detecting rib edges comprises detecting actual rib edges in both of said temporally separated digital first and second images.

21. The method of claim 20, wherein said step of detecting rib edges comprises detecting actual rib edges in both of said temporally separated digital first and second images.

22. A method of computerized processing of chest images, comprising:

obtaining digital first and second images of a chest including internal rib edges of ribs located interior of a rib cage and overlaying a lung;

selecting template regions of interest (ROIs) in one of said first and second images and search area ROIs in an other of said first and second images;

determining cross correlation values between pixels in said template ROIs and said search area ROIs;

determining shift vectors for said template ROIs, comprising,
  determining local shift vectors between pixels in said search ROIs relative to said template ROIs,
  determining internal and external energies based on smoothness of said local shift vectors and said cross correlation values, respectively, and
  modifying said local shift vectors based at least in part on said internal and external energies;
  producing said shift vectors based on said modified local shift vectors; and
warping one of said first and second images to produce a warped image which is registered to said other of said first and second images based at least in part on said shift vectors.

23. The method of claim 22, further comprising subtracting said warped image from said other image to generate a subtraction image.

24. The method of claim 22, further comprising displaying said subtraction image.

25. The method of claim 22, wherein said step of producing shift vectors further comprises performing bilinear interpolation on said modified local shift vectors on image pixels of two lungs of one of said first and second images.

26. The method of claim 22, wherein said step of obtaining said first and second images comprises performing preprocessing for density correction, lateral inclination correction and global matching on at least one of said first and second images.

27. The method of claim 22, wherein said step of obtaining digital first and second images comprises:
  obtaining said digital first image; and
  obtaining as said second image a mirror image of said digital first image.

28. The method of claim 27, further comprising performing lateral inclination correction on said digital first image prior to obtaining said mirror image.

29. The method of claim 22, wherein said step of obtaining digital first and second images comprises obtaining temporally separated digital first and second images of a same chest.

30. The method of claim 29, further comprising performing lateral inclination correction on said temporally separated digital first and second images.

31. An image processing system configured to perform the steps recited in one of claims 1 to 30.

32. A storage medium storing a program for performing the steps recited in one of claims 1 to 30.

33. A method of computerized processing of chest images, comprising:
  obtaining digital first and second images of a chest;
  detecting internal rib edges of ribs located interior of a rib cage and overlaying a lung in at least one of said first and second images, comprising;
    correlating points in said at least one of said first and second images to plural rib edge models using a Hough transform to identify approximate rib edges in said one of said images, and
    delineating actual rib edges derived from the identified approximate rib edges using a snake model;
  deriving shift values using said actual rib edges; and
  warping one of said first and second images to produce a warped image which is registered to an other of said first and second images based at least in part on said shift values;
  wherein said step of obtaining digital first and second images comprises:
    obtaining said digital first image; and
    obtaining as said second image a mirror image of said digital first image.

34. The method of claim 33, further comprising performing lateral inclination correction on said digital first image prior to obtaining said mirror image.

35. A method of computerized processing of chest images, comprising:
  obtaining digital first and second images of a chest;
  detecting internal rib edges of ribs located interior of a rib cage and overlaying a lung in at least one of said first and second images, comprising;
    correlating points in said at least one of said first and second images to plural rib edge models using a Hough transform to identify approximate rib edges in said one of said images, and
    delineating actual rib edges derived from the identified approximate rib edges using a snake model;
  deriving shift values using said actual rib edges; and
  warping one of said first and second images to produce a warped image which is registered to an other of said first and second images based at least in part on said shift values; and
  wherein said step of deriving shift values comprises deriving global shift values; and
  said step of warping comprises producing a globally warped image which is registered to said other of said first and second images based at least in part on said global shift values; and
  wherein said step of warping comprises,
    deriving local shift values from a difference between said globally warped image and a non-warped image, and
    locally warping said globally warped image to produce a locally warped image which is registered to said non-warped image using said local shift values; and
  wherein said step of deriving local shift values comprises,
    selecting template regions of interest (ROIs) in one of said globally warped image and said non-warped image and search area ROIs in an other of said globally warped image and said non-warped image,
    determining cross correlation values between pixels in said template ROIs and said search area ROIs,
    determining local shift vectors for said template ROIs, comprising,
      determining local shift vectors between pixels in said search ROIs relative to said template ROIs,
      determining internal and external energies based on smoothness of said local shift vectors and said cross correlation values, respectively, and
      modifying said local shift vectors based at least in part on said internal and external energies; and
      producing said local shift values based on said modified local shift vectors; and
  wherein said step of obtaining digital first and second images comprises,
    obtaining s aid digital first image, and
    obtaining as said second digital image a mirror image of said digital first image.

36. The method of claim 35, further comprising performing lateral inclination correction on said digital first image prior to obtaining said mirror image.

37. A method of computerized processing of chest images, comprising:
  obtaining digital first and second images of a chest including internal rib edges of ribs located interior of a rib cage and overlaying a lung;

selecting template regions of interest (ROIs) in one of said first and second images and search area ROIs in an other of said first and second images;

determining cross correlation values between pixels in said template ROIs and said search area ROIs;

determining shift vectors for said template ROIs, comprising,
- determining local shift vectors between pixels in said search ROIs relative to said template ROIs,
- determining internal and external energies based on smoothness of said local shift vectors and said cross correlation values, respectively, and
- modifying said local shift vectors based at least in part on said internal and external energies;
- producing said shift vectors based on said modified local shift vectors; and
- warping one of said first and second images to produce a warped image which is registered to said other of said first and second images based at least in part on said shift vectors; and wherein said step of obtaining digital first and second images comprises,
- obtaining said digital first image, and
- obtaining as said second image a mirror image of said digital first image.

38. The method of claim 37, further comprising performing lateral inclination correction on said digital first image prior to obtaining said mirror image.

39. The method of one of claim 33 or 35, wherein the detecting the rib edges step comprises detecting internal rib edges of ribs located interior of a rib cage.

40. The method of one of claim 33 or 35, wherein the correlating points step comprises correlating points in said at least one of said first and second images to plural rib edge models using a generalized Hough transform to identify approximate rib edges in said one of said images.

41. The method according to claim 1, wherein the correlating step comprises:

detecting lower edges of posterior ribs.

42. The method according to claim 41, wherein the correlating step further comprises selecting as edge pixels pixels having edge gradient orientations between 90° and 170°.

43. The method according to claim 41, wherein the correlating step further comprises identifying pixels at lower edges of posterior ribs.

44. A computer program product storing program instructions, which when executed by a computer system, cause the computer system to perform the method recited in any one of claims 41–43.

45. A system implementing any one of claims 41–43.

* * * * *